United States Patent
Lin et al.

(10) Patent No.: US 9,200,945 B2
(45) Date of Patent: Dec. 1, 2015

(54) WAVELENGTH DIVISION SENSING RF VIBROMETER FOR ACCURATE MEASUREMENT OF COMPLEX VIBRATIONS

(71) Applicant: UNIVERSITY OF FLORIDA RESEARCH FOUNDATION, INC., Gainesville, FL (US)

(72) Inventors: Jenshan Lin, Gainesville, FL (US); Yan Yan, Gainesville, FL (US); Changzhi Li, Lubbock, TX (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 288 days.

(21) Appl. No.: 13/692,892

(22) Filed: Dec. 3, 2012

(65) Prior Publication Data

US 2013/0139597 A1     Jun. 6, 2013

Related U.S. Application Data

(60) Provisional application No. 61/565,863, filed on Dec. 1, 2011.

(51) Int. Cl.
*G01H 9/00*     (2006.01)
(52) U.S. Cl.
CPC ...................... *G01H 9/00* (2013.01)
(58) Field of Classification Search
CPC ............................................................ G01H 9/00
USPC ................................ 73/657; 324/642; 702/56
See application file for complete search history.

(56) References Cited

U.S. PATENT DOCUMENTS

| | | | |
|---|---|---|---|
| 6,768,938 B2 | 7/2004 | McBrien et al. |
| 6,931,341 B2 | 8/2005 | Wakabayashi et al. |
| 7,073,384 B1 | 7/2006 | Donskoy et al. |
| 7,116,426 B2 | 10/2006 | Lal et al. |

(Continued)

FOREIGN PATENT DOCUMENTS

JP     2007-010373     1/2007

OTHER PUBLICATIONS

Blum, T.E., et al., "Advances in Laboratory Modeling of Wave Propagation," *Optical Engineering*, Oct. 24, 2006, Article No. 104302.

(Continued)

*Primary Examiner* — John Chapman, Jr.
(74) *Attorney, Agent, or Firm* — Thomas | Horstemeyer, LLP; Randy Schoen; Christopher Linder

(57) ABSTRACT

Embodiments of the present invention provide a method for non-contact detection techniques of mechanical vibrations utilizing a radio frequency system incorporating multiple carrier wavelengths. The new detection method measures multiple harmonic pairs at a carrier frequency and improves the detection accuracy and reliability by first inspecting the Bessel function coefficient of each harmonic and then determining the harmonic amplitude. The original mechanical vibration can then be reconstructed. Embodiments can be used to realize sensing of complex non-sinusoidal vibrations using a wavelength division sensing technique and allow non-contact detection through walls, smoke, fog or other low visibility environments with the advantage of longer range detection and easy integration at a low cost.

28 Claims, 11 Drawing Sheets

(56) References Cited

U.S. PATENT DOCUMENTS

| | | | |
|---|---|---|---|
| 7,477,398 | B2 | 1/2009 | Lal et al. |
| 7,848,896 | B2 | 12/2010 | Li et al. |
| 2004/0141417 | A1 | 7/2004 | Wakabayashi et al. |
| 2008/0300805 | A1* | 12/2008 | Li et al. ............................ 702/56 |
| 2008/0302187 | A1 | 12/2008 | Huber et al. |
| 2010/0226504 | A1 | 9/2010 | Watanabe |
| 2010/0281986 | A1 | 11/2010 | Toal et al. |

OTHER PUBLICATIONS

Castellini, P., et al., "Laser Doppler Vibrometry: Development of Advanced Solutions Answering to Technology's Needs," *Mechanical Systems and Signal Processing*, Aug. 2006, vol. 20, No. 6, pp. 1265-1285.

Droitcour, A.D., et al., "Range Correlation and I/Q Performance Benefits in Single-Chip Silicon Doppler Radars for Noncontact Cardiopulmonary Monitoring," *IEEE Transactions on Microwave Theory and Techniques*, Mar. 2004, vol. 52, No. 3, pp. 838-848.

Ivanov, E.N., et al., "Microwave Interferometry: Application to Precision Measurements and Noise Reductions Tecniques," *IEEE Transactions on Ultrasonics, Ferroelectrics, and Frequency Control*, Nov. 1998, vol. 45, No. 6, pp. 1526-1536.

Kim, S., et al., "On the Development of a Multifunction Millimeter-Wave Sensor for Displacement Sensing and Low-Velocity Measurement," *IEEE Transactions on Microwave Theory and Techniques*, Nov. 2004, vol. 52, No. 11, pp. 2503-2512.

Lai, S.H.Y., "Engine System Diagnosis Using Vibration Data," *Computers and Industrial Engineering*, Sep. 1993, vol. 25, Nos. 1-4, pp. 135-138.

Li, C., et al., "Non-Contact Measurement of Periodic Movements by a 22-40GHz Radar Sensor Using Nonlinear Phase Modulation," IEEE/MTT-S International Microwave Symposium, Honolulu, HI, Jun. 2007, pp. 579-582.

Li, C., et al., "Random Body Movement Cancellation in Doppler Radar Vital Sign Detection," *IEEE Transactions on Microwave Theory and Techniques*, Dec. 2008, vol. 56, No. 12, pp. 3143-3152.

MacPherson, W.N., et al., "Multipoint Laser Vibrometer for Modal Analysis," *Applied Optics*, Jun. 2007, vol. 46, No. 16, pp. 3126-3132.

Stelzer, A., et al., "A Microwave Position Sensor with Sub-Millimeter Accuracy," *IEEE Transactions on Microwave Theory and Techniques*, Dec. 1999, vol. 47, No. 12, pp. 2621-2624.

Yan, Y., et al., "Effects of I/Q Mismatch on Measurement of Periodic Movement Using a Doppler Radar Sensor," IEEE Radio and Wireless Symposium, 2010, pp. 196-199.

Yan, Y., et al., "Ka-band Quadrature Doppler Radar System with Sub-millimeter Resolution and Sensitivity in Measuring Periodic Movement," 11th Annual IEEE Wireless and Microwave Technology Conference, Apr. 2010, pp. 12-13.

Yan, Y., et al., "Wavelength Division Sensing RF Vibrometer," IEEE/MTT-S International Microwave Symposium, Baltimore, MD, Jun. 2011.

Yoshizumi, N., et al., "Multiple-Frequency Ultrasonic Imaging by Transmitting Pulsed Waves of Two Frequencies," *Journal of Medical Ultrasonics*, Jun. 2009, vol. 36, No. 2, pp. 53-60.

Yan Yan, et al.; Analysis of Detection Methods of RF Vibrometer for Complex Motion Measurement; IEEE Transactions on Microwave Theory and Techniques, vol. 59, No. 12, Dec. 2011; p. 3556-3566.

\* cited by examiner

WAVELENGTH DIVISION SENSING RF VIBROMETER FOR ACCURATE MEASUREMENT OF COMPLEX VIBRATIONS

CROSS-REFERENCE TO RELATED APPLICATION

The present application claims the benefit of U.S. Provisional Application Ser. No. 61/565,863, filed Dec. 1, 2011, which is hereby incorporated by reference in its entirety, including any figures, tables, or drawings.

BACKGROUND OF INVENTION

Microwave and millimeter-wave technologies have been widely used for position sensing, such as described in Stezer et al., "Microwave position sensor with sub millimeter accuracy," IEEE Trans. Microwave Theory and Techniques, vol. 47, pp. 2621-2624, December 1999. Microwave and millimeter techniques have also been used for precision noise measurement, such as described in Ivanov et al., "Microwave interferometry: Application to precision measurements and noise reduction techniques," IEEE Trans. Ultrason., Ferroelect., Freq. Contr., vol. 45, pp. 1526-1536, November 1998. Likewise, microwave and millimeter-wave methods have been applied to displacement measurement, such as described in Kim et al., "On the development of a multifunction millimeter-wave sensor for displacement sensing and low-velocity measurement," IEEE Trans. Microwave Theory and Techniques, vol. 52, pp 2503-2512, November 2004.

In addition, microwave and millimeter technologies have been applied to cardio pulmonary sensing, such as described in Droitcour et al., "Range correlation and I/Q performance benefits in single-chip silicon Doppler radars for noncontact cardiopulmonary monitoring," IEEE Trans. Microwave Theory and Techniques, vol. 52, pp. 838-848, March 2004. The mechanism of most of the microwave displacement-related measurement systems is the detection of the phase shift caused by the movement of the target. Based on this, a Doppler radar has been developed to monitor periodic vital sign movements, and a linear approximation was used to analyze the performance as shown by Droitcour et al. However, the system could only detect the frequency of movement, not the amplitude.

A microwave Doppler radar sensor has been reported to be able to measure both displacement and velocity of one direction movements by measuring Doppler frequency shift. S. Kim, and Cam Nguyen, "On the development of a multifunction millimeter-wave sensor for displacement sensing and low-velocity measurement," IEEE Trans. Microwave Theory and Tech. vol. 52, pp. 2503-2512, November 2004. (Kim et al.) The recently discovered nonlinear Doppler phase modulation effect, which would generate harmonics of the movement frequency when the movement amplitude is comparable to the carrier wavelength, has brought out an alternative method to obtain the pattern of a purely sinusoidal movement. C. Li and J. Lin. "Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007. (Li et al.) In order to eliminate the residual phase effect that will result in the null detection point problem identified by Yan et al. (Y. Yan, C. Li, and J. Lin, "Ka-band Quadrature Doppler Radar System with Sub-millimeter Resolution and Sensitivity in Measuring Periodic Movement," IEEE Wireless and Microwave Technology Conference, 12-13, April 2010), Li et al. take the amplitude ratio between two even order or two odd order frequency components on the baseband spectrum to cancel out the associated residual phase, leaving the ratio determined only by the Bessel function of the movement amplitude. Sine the movement frequency can be read directly from the baseband spectrum, after obtaining the value of movement amplitude from the harmonic amplitude ratio, the originally unknown periodic movement can be reconstructed.

The microwave Doppler radar in Kim et al. requires high-sampling rate to track the instantaneous velocity of a moving target, and can, therefore, be limited to measure low-velocity movements. On the other hand, the detection method based on nonlinear Doppler phase modulation effect does not need to measure the instantaneous velocity, and the sampling rate of the radar system is relaxed to only a few times (two or three) of the fundamental frequency of the periodic movement. The residual phase problem can limit the radar in Li et al. to measuring sinusoidal movements. When the movement pattern of the target is a non-sinusoidal periodic waveform, such as multiple sine waves of different frequencies, the detection method of Li el al. may not be effective.

Accordingly, there is a need for a method and apparatus for accurate non-contact measurement of frequency and amplitude of mechanical vibration that can be non-sinusoidal.

BRIEF SUMMARY

Embodiments of the subject invention relate to a method and apparatus for providing a RF vibrometer using a wavelength division sensing technique. Embodiments can accurately measure mechanical vibrations having complex patterns that include multiple frequency components, such as triangular waveform or square-wave movement patterns. Embodiments of the method of detection use multiple harmonics in the baseband spectrum generated from nonlinear Doppler phase modulation effect. Embodiments measure the amplitude ratio of multiple harmonic pairs under a fixed carrier frequency to calculate the amplitude of each frequency components of the vibration. An RF vibrometer can be implemented as an indirect-conversion Doppler radar that features quadrature system architecture and utilizes a complex signal demodulation technique to eliminate the residual phase effect. Embodiments of the subject RF vibrometer can be used as an alternative to a laser displacement sensor, due to its advantages of long detection range, workability in low-visibility environment, low cost integration, as well as having comparable detection accuracy with respect to the laser displacement sensor.

Further embodiments of the method of detection use the amplitude ratio of a pair of baseband harmonics under different carrier wavelengths to calculate the amplitude of each frequency components of the vibration. An embodiment of the subject RF vibrometer can be implemented as a tunable carrier frequency Doppler radar sensor that includes a radio transceiver and a baseband module. A phase locked loop (PLL) can be integrated in the transceiver to generate different carrier frequencies. In a specific embodiment, the phase locked loop can be software-controlled. The accuracy of the noncontact detection technique using embodiments of the subject RF vibrometer can be comparable to other contact vibration measurement instruments, such as a linear variable differential transformer (LVDT) or a piezoelectric-based accelerometer. In a specific embodiment, real-time monitoring of a baseband signal and real-time signal processing can be integrated together to realize real-time vibration pattern monitoring.

In another embodiment, the nonlinear Doppler phase modulation effect, which would generate harmonics of the movement frequency when the movement amplitude is comparable to the carrier wavelength, allows a method to obtain the pattern of a purely sinusoidal movement. The residual phase effect that will result in the null detection point problem is eliminated by calculating the amplitude ratio between two even order or two odd order frequency components on the baseband spectrum to cancel out the associated residual phase, leaving the ratio determined only by the Bessel function of the movement amplitude. Since the movement frequency can be read directly from the baseband spectrum, after obtaining the value of movement amplitude from the harmonic amplitude ratio, the originally unknown periodic movement can be reconstructed. With the advantage of low sampling rate requirement for measuring high-speed vibrations as well as high accuracy, embodiments of a Doppler radar sensor in accordance with the subject application can provide a low-cost alternative to laser displacement sensors and an alternative to laser Doppler vibrometers in applications of non-contact detection of mechanical vibrations, such as engine or motor vibrations in vehicles.

DETAILED DISCLOSURE

Figure 1:
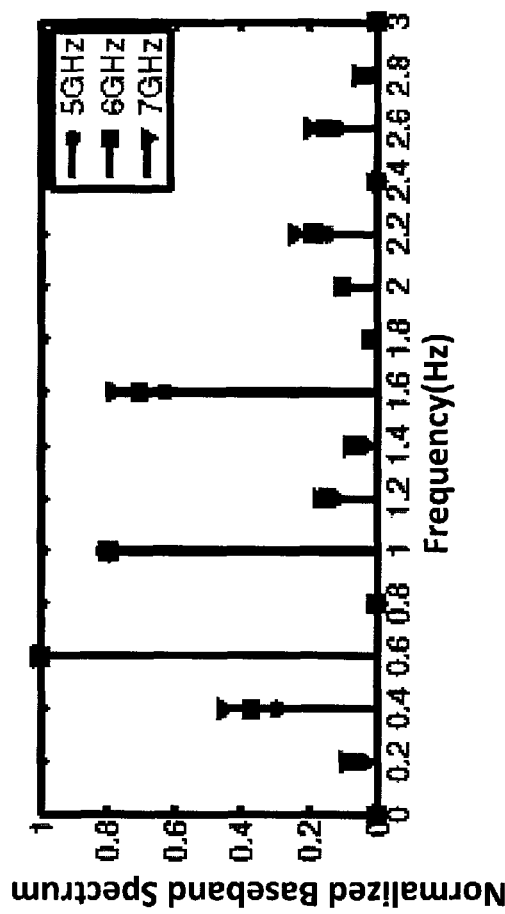
FIG. 1 illustrates radar-detected baseband spectrum under carrier frequencies of 5 GHz, 6 GHz, and 7 GHz.

Embodiments of the subject invention can be utilized for, in, or in conjunction with, non-contact mechanical vibration monitoring systems; sinusoidal and non-sinusoidal periodic movement monitoring systems; see-thru-wall or see-thru-fog/dust vibration detection systems; and/or non-contact vital sign detectors that can measure the complex waveforms of vital signs for medical diagnoses or other purposes.

Embodiments of the subject invention can accurately measure not only single tone periodic movement, but also complex vibrations that include multiple frequency components. Since the vibrations in real world settings are usually complex and include more than one frequency component, embodiments of the subject invention can be utilized for practical applications.

In contrast with existing laser vibrometers or displacement sensors used for precision vibration measurement, embodiments of the subject RF vibrometer can detect vibrations behind obstacles that the laser cannot penetrate through. In addition, the cost of using certain embodiments of the subject RF radar sensor is much lower than the cost of using laser-based systems.

I. Detection Theory and Simulation

A. Detection Theory

A periodic vibration pattern can usually be decomposed into a series of sine waves of different frequencies, as represented in equation (1), $$x(t)=m_1 \sin(2\pi\alpha t)+m_2 \sin(2\pi\beta t)+\ldots m_N\sin(2\pi\gamma t) \quad (1)$$

where $m_n$ represents the amplitude of each frequency component, and $\alpha, \beta, \ldots$ and $\gamma$ denote the frequency of each in Hz, and it is assumed that they are in ascending order and are arbitrary positive numbers. N indicates the number of the frequency components of the vibration. The radar transmits a signal at the carrier frequency towards the vibratory target, and the phase of the reflected signal is modulated by the vibration movement. The same transmitting signal is also used as the reference to down-convert the received signal into quadrature baseband signals. Using a complex signal demodulation technique (C. Li and J. Lin. "Random body movement cancellation in doppler radar vital sign detection," IEEE Trans. Microwave Theory and Techniques, vol. 56, pp. 3143-3152. December 2008.), the combined complex baseband signal of I/Q channels can be written as:

$$S(t) = I(t) + j \cdot Q(t) \quad (2)$$

$$= A \cdot \exp\left\{j\left[\frac{4\pi x(t)}{\lambda} + \phi\right]\right\}$$

$$= A \cdot \sum_{k=-\infty}^{\infty}\sum_{l=-\infty}^{\infty} \ldots \sum_{p=-\infty}^{\infty} J_k\left(\frac{4\pi m_1}{\lambda}\right) J_l\left(\frac{4\pi m_2}{\lambda}\right) \ldots J_p\left(\frac{4\pi m_N}{\lambda}\right) \cdot$$

$$e^{j[2\pi(\alpha k+\beta l+\ldots+\gamma p)t]} \cdot e^{j\phi}$$

where A is the amplitude of the baseband signal, Jn is the Bessel function of the first kind (with k, l, and p being integers), $\lambda$ is the carrier wavelength, $\phi$ is the total residue phase accumulated in the circuit and along the transmission path. Since $e^{j\omega}$ has a constant-envelope of unity, the effect of $\phi$ on signal amplitude is thus eliminated. When the term $\alpha k+\beta l+\ldots+\gamma \cdot p$ in the exponent equals to x, it denotes the frequency of the harmonic is x Hz, and its strength can be represented as:

$$H_x = A \cdot \left|\sum_{k=-\infty}^{\infty}\sum_{l=-\infty}^{\infty} \ldots \sum_{p=-\infty}^{\infty} J_k\left(\frac{4\pi m_1}{\lambda}\right) J_l\left(\frac{4\pi m_2}{\lambda}\right) \ldots J_p\left(\frac{4\pi m_N}{\lambda}\right)\right| \quad (3)$$

with the constraint of $\alpha k+\beta l+\ldots+\gamma \cdot p=x$. It can be figured out that x is an integer multiple of the largest common divisor of all the frequency components of the vibration. Since the harmonic strength is a function of the N amplitudes of each frequency component of the vibration, we can choose a certain pair of harmonics and measure their amplitude ratio under N different carrier frequencies. The N unknown amplitudes of all the frequency components of the vibration can then be calculated by solving N equations.

The frequencies of all the components of the vibration can be identified from the baseband spectrum directly. Although there will be harmonics other than the frequency components of the vibration itself due to nonlinear phase modulation effect, as long as the carrier wavelength is much larger (e.g., about 10 times) compared to the vibration amplitude, the nonlinear effect will be weak. The amplitudes of those harmonics will be smaller than those belonging to the vibration itself. Thus, if the vibration contains N frequency components, the frequency of each can be figured out by identifying the strongest N harmonics in the baseband spectrum. With the information of the amplitude and frequency of each, the originally unknown vibration pattern can be recovered.

B. Verification through Simulation

The detection theory was verified through simulation first before the experiment was conducted. In simulation, the vibration pattern is assumed to be $x(t)=3 \sin(2\pi \cdot 0.6 \cdot t)+2.5 \sin(2\pi 1 \cdot t)+\sin(2\pi \cdot 1.6 \cdot t)$ (unit: mm). The frequency and amplitude of each sine wave component are chosen arbitrarily to make a general case. Since the vibration contains three frequency components, three carrier frequencies, at 5 GHz, 6 GHz, and 7 GHz, are used to solve the unknown amplitudes of the three frequency components. FIG. 1 shows the radar-detected baseband spectrum under the three carrier frequencies. It can be seen that besides the three frequency components of the vibration itself (0.6 Hz, 1 Hz, 1.6 Hz), there are also other intermodulation frequency components due to the nonlinear Doppler phase modulation effect. All of the frequencies are integer multiples of 0.2 Hz, which is the largest common divisor of 0.6 Hz, 1 Hz and 1.6 Hz as predicted before. The relative strength between harmonics also varies with the carrier frequency. We measured the ratio between $H_{0.4}$ from the low frequency range and $H_{2.2}$ from the high frequency range under the three carrier frequencies. $\lambda_1$, $\lambda_2$, and $\lambda_3$ are the carrier wavelengths correspond to 5 GHz, 6 GHz and 7 GHz, respectively. Based on (3), let $u=4\pi M_1/\lambda$ $v=4\pi\ m_2/\lambda_1$, $w=4\pi\ m_3/\lambda_1$, $a=\lambda_1/\lambda_2$, $b=\lambda_1/\lambda_3$, then the three equations are built using the measured values.

$$5\ GHz: H_{0.4}(u,v,w)/H_{2.2}(u,v,w)=2.0783 \quad (4.1)$$

$$6\ GHz: H_{0.4}(a_u,a_v,a_w)/H_{2.2}(a_u,a_v,a_w)=1.9761 \quad (4.2)$$

$$7\ GHz: H_{0.4}(b_u,b_v,b_w)/H_{2.2}(b_u,b_v,b_w)=1.8816 \quad (4.3)$$

The root of the equations are $m_1=2.94$, $m_2=2.59$, $m_3=0.96$. All of them have less than 4% error compared to the real value of $m_1=3$, $m_2=2.5$, $m_3=1$. The small amount of deviation is tolerable considering the existence of some inherent numeric error of the calculation.

II. Experiment

Figure 2:
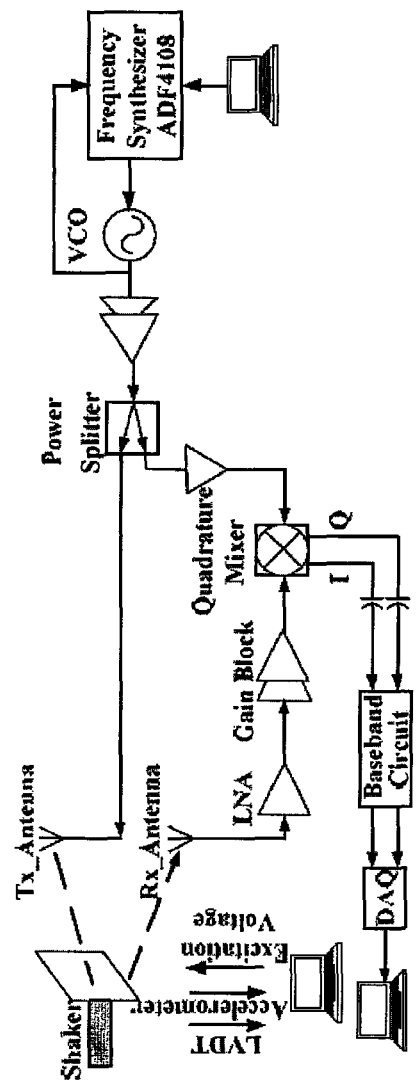
FIG. 2 shows a block diagram of an embodiment of a wavelength division sensing RF vibrometer in accordance with the subject invention.

The block diagram of an RF vibrometer in accordance with an embodiment of the subject invention is shown in FIG. 2. A frequency synthesizer ADF4108 and external voltage controller oscillator (VCO) with 4-8.5 GHz tuning range form a phase-locked loop (PLL) to generate different carrier frequencies. The output power of the PLL is about −8 dBm, through two stage amplifiers and a power splitter, the transmit power at the antenna connector is around 0 dBm. The gain of the receiving chain is 35 dB. The quadrature baseband signal is sent to a processor, such as a laptop, through a data acquisition system (DAQ) for real-time signal processing.

Figure 3A:
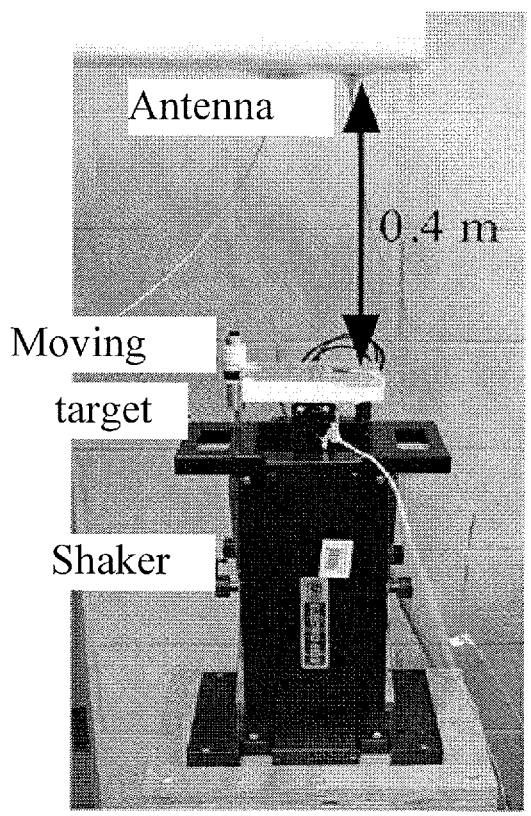
FIGS. 3A-3B show (3A) setup of an experiment and (3B) an LVDT and accelerometer attached on the moving target.
Figure 3B:

The experiment setup is shown in FIG. 3A. The antenna is placed at 0.4 m above the vibrating target. The vibration is driven by a long-stroke shaker from APS Dynamics. A Labview program is used to generate the excitation voltage of the shaker. A linear variable differential transformer (LVDT) and an accelerometer are attached on the vibrating target as shown in FIG. 3B. The real-time data from them are sent back to the computer for monitoring. Since the LVDT can accurately measure the vibration displacement directly, it is used to provide a reference of the actual movement pattern.

Figure 4A:
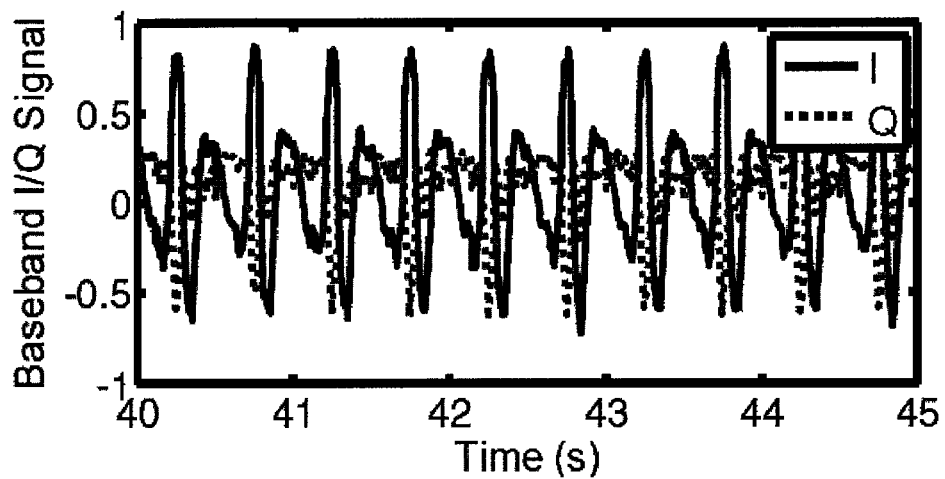
FIGS. 4A-4B show baseband I/Q signals at 6 GHz (4A) and a normalized baseband spectrum (4B) at 6 GHz.
Figure 4B:
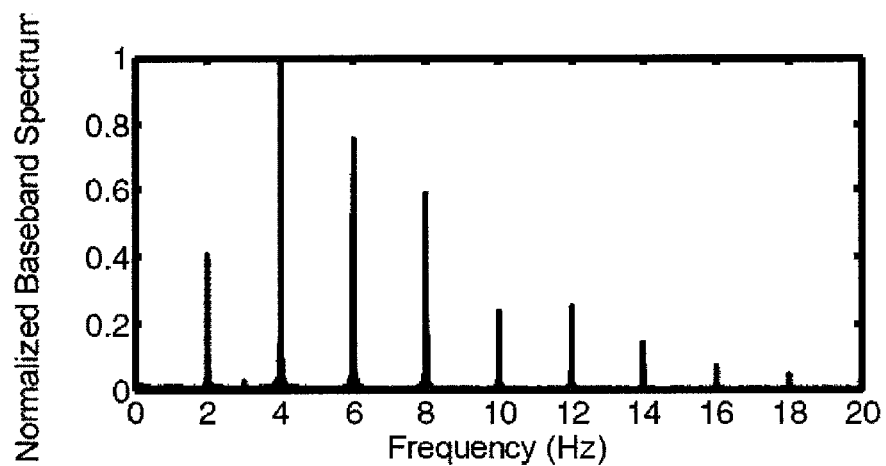

In experiment, a vibration containing three sine wave components at different frequencies is generated. Thus, three carrier frequencies are needed to recover the original movement pattern. The output voltage from the charge pump of the frequency synthesizer is approximately 0-4.5V, which corresponds to 5-7 GHz of the VCO, and 5.5 GHz, 6 GHz, 6.5 GHz are used. FIG. 4 shows the measured baseband quadrature signal and the normalized spectrum of the combined complex baseband output at 6 GHz, respectively. The monitored LVDT waveform shows that the vibration amplitude is about 5 mm. While the carrier wavelengths are around 50 mm, which are much larger than the vibration amplitude. Hence, as illustrated in the discussion of the detection theory in section I(A), the strength of the harmonics generated due to the nonlinear phase modulation effect will be weaker than that of the frequency components of the vibration itself. As shown in FIG. 4B, the strongest three harmonics are located at 4 Hz, 6 Hz and 8 Hz, the three frequency components of the vibration.

When choosing the harmonic pair for solving the amplitude of each frequency component of the vibration, in a specific embodiment, harmonics involving both low frequency and high frequency components in the baseband spectrum can be used. Using two harmonics that are both located at low frequencies or using two harmonics that are both located at high frequencies may not contain enough information about the shape of the whole spectrum and may increase error in calculation. Thus, in the experiment, the harmonic pair $H_2$ and $H_{10}$ is chosen.

In the experiment, at each carrier frequency, 10 measurements are conducted. The average value of measured $H_2/H_{10}$ at 5.5 GHz, 6 GHz and 6.5 GHz are 1.84, 1.89 and 1.95, respectively. Using equations 4.1, 4.2, and 4.3, $\lambda_1$, $\lambda_2$, and $\lambda_3$ are the carrier wavelengths corresponding to 5.5 GHz, 6 GHz and 6.5 GHz, respectively. $m_1$, $m_2$ and $m_3$ represent the amplitudes of the frequency components at 4 Hz, 6 Hz and 8 Hz, and $u=4\pi m_1/\lambda_1$, $v=4\pi m_2/\lambda_1$, $w=4\pi m_3/\lambda_1$, $a=\lambda_1/\lambda_2$, $b=k_1/\lambda_3$. Three equations are constructed as:

$$5.5 \text{ GHz}: H_2(u,v,w)/H_{10}(u,v,w)=1.84 \quad (5.1)$$

$$6 \text{ GHz}: H_2(a_u,a_v,a_w)/H_{10}(a_u,a_v,a_w)=1.89 \quad (5.2)$$

$$6.5 \text{ GHz}: H_2(b_u,b_v,b_w)/H_{10}(b_u,b_v,b_w)=1.95 \quad (5.3)$$

The solutions are $m_1=2.329$, $m_2=1.921$, $m_3=0.855$ (unit: mm). In addition, $f_1=4$ Hz, $f_2=6$ Hz, $f_3=8$ Hz. Therefore, the recovered vibration pattern using the RF vibrometer has the expression as:

$$x(t)=2.329 \sin(2\pi \cdot 4 \cdot t)+1.921 \sin(2\pi \cdot 6 \cdot t)+0.855 \sin(2\pi \cdot 8 \cdot t) \quad (6)$$

III. Performance Analysis

An accelerometer is a conventional instrument used to measure vibrations. In this experiment, an accelerometer is also used. Since the accelerometer measures the acceleration of the vibration, the acceleration waveform is integrated twice to recover the displacement of the vibration. It is interesting to compare the performance of an embodiment of an RF vibrometer in accordance with the subject invention and the results of the accelerometer by comparing their recovered vibration patterns using the linear variable differential transformer (LVDT) output as a reference.

Figure 5A:
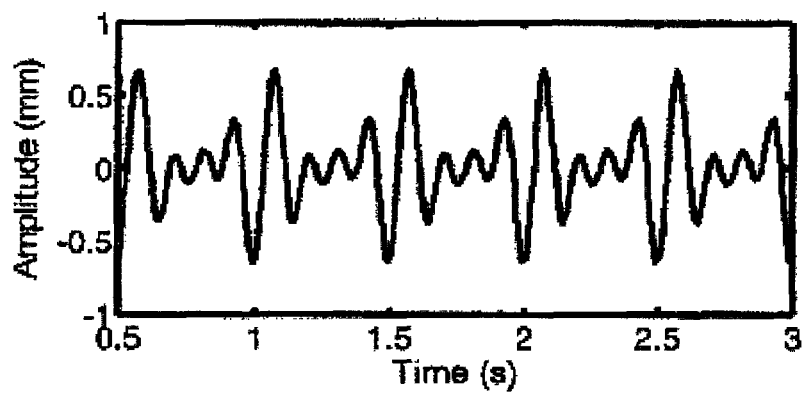
FIG. 5A shows an acceleration signal from an accelerometer.
Figure 5B:
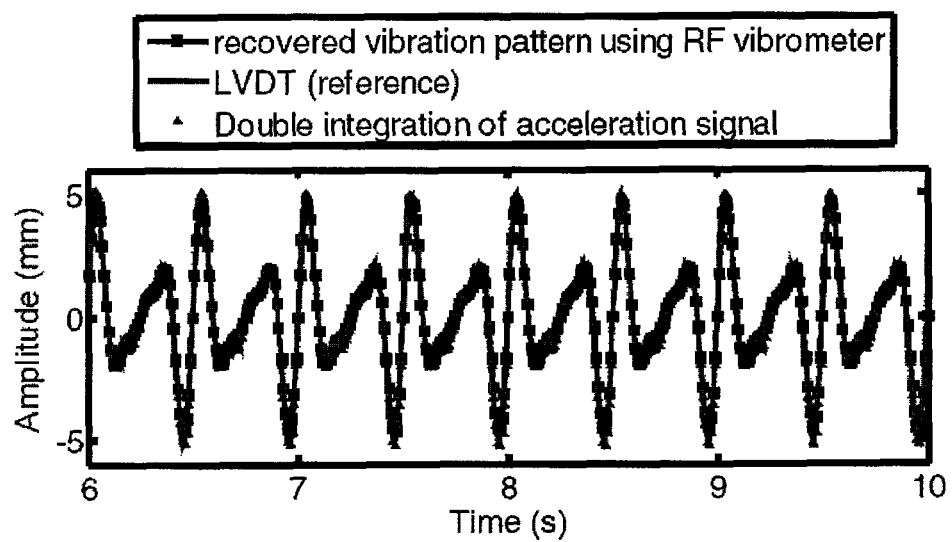
FIG. 5B shows a comparison of recovered vibration pattern using an embodiment of an RF vibrometer in accordance with the subject invention, accelerometer, and the reference from LVDT.

FIG. 5A shows the acceleration signal from the accelerometer. FIG. 5B shows the comparison of the three waveforms: one is the recovered vibration pattern using an embodiment of the subject RF vibrometer, which is represented in equation (6), and the other two are the recovered displacement by double-integrating the acceleration signal and the reference signal coming from the LVDT. Referring to FIG. 5B, the recovered vibration pattern using the embodiment of the subject RF vibrometer agrees well with the reference signal. The correlation coefficient between the waveform recovered from the embodiment of the subject RF vibrometer and the accelerometer relative to the reference is 0.9987 and 0.9924, respectively. Hence the embodiment of the subject RF vibrometer can achieve an accuracy comparable with the accelerometer.

In order to further analyze the accuracy of the detection method using the embodiment of the subject RF vibrometer, it is useful to know the actual amplitude of each frequency component of the vibration and compare the amplitudes to the calculated ones shown in equation (6). The curve fitting toolbox of Matlab™ is used to obtain the actual amplitude of each frequency component of the vibration by fitting the LVDT signal. The result is $m_1=2.54$, $m_2=1.896$, $m_3=0.97$. The measured amplitudes using the embodiment of the subject RF vibrometer are $m_1=2.329$, $m_2=1.921$, $m_3=0.855$. They are approximately ±10% compared to the actual values.

It has been shown that the amplitude or phase mismatch between the I/Q channels will cause deviation of the amplitude ratio between harmonics in the baseband, and, thus, result in an error for the final calculated amplitude of each frequency component of the vibration (Y. Yan, C. Li, J. Lin, "Effects of I/Q mismatch on measurement of periodic movement using a doppler radar sensor," IEEE Radio and Wireless Symp, pp. 196-199, 2010). The I/Q signal with amplitude and phase mismatch can be written as:

$$I(t) = A\cos\left[\frac{4\pi}{\lambda}x(t)+\phi\right] \quad (7)$$

$$Q(t) = (1-\varepsilon)A\cos\left[\frac{4\pi}{\lambda}x(t)+\phi-\frac{\pi}{2}-\theta\right]$$

where $x(t)=2.54 \sin(2\pi \cdot 4 \cdot t)+1.896 \sin(2\pi \cdot 6 \cdot t)+0.97 \sin(2\pi \cdot 8 \cdot t)$, which is the actual vibration displacement. $20\log(1/1-\varepsilon)$ is the amplitude imbalance in dB scale, $\theta$ represents the phase imbalance. The data sheet of the quadrature mixer shows that it can have up to 1 dB amplitude mismatch and 10° phase mismatch. Since we are using $H_2/H_{10}$ to calculate the amplitude of each frequency component of the vibration, it is important to know how much deviation of the ratio will be introduced by the I/Q imbalance.

TABLE 1

I/Q Mismatch Effect on $H_2/H_{10}$ and $m_1$, $m_2$ and $m_3$

| | 20log(1/1 − ε) | | | | | | |
|---|---|---|---|---|---|---|---|
| | 0.3 dB | | 0.5 dB | | 1 dB | | 0 dB |
| | | | θ | | | | |
| | 5° | 10° | 5° | 10° | 5° | 10° | 0° |
| $H_2/H_{10}$@5.5G | 1.87 | 1.87 | 1.83 | 1.84 | 1.76 | 1.76 | 1.93 |
| $H_2/H_{10}$@6G | 1.93 | 1.93 | 1.89 | 1.89 | 1.80 | 1.81 | 1.99 |
| $H_2/H_{10}$@6.5G | 1.99 | 2.0 | 1.95 | 1.95 | 1.85 | 1.86 | 2.06 |
| $m_1$ (mm) | 2.44 | 2.44 | 2.33 | 2.33 | 2.1 | 2.1 | 2.54 |
| $m_2$ (mm) | 1.9 | 1.9 | 1.92 | 1.92 | 1.76 | 1.77 | 1.9 |
| $m_3$ (mm) | 0.91 | 0.91 | 0.85 | 0.86 | 0.75 | 0.76 | 0.97 |

Table I shows $H_2/H_{10}$ and the calculated amplitude of each frequency component under different I/Q mismatch scenarios. The last column provides the ideal values when there is no I/Q mismatch. It can be found that amplitude imbalance will have more evident effect on the harmonic amplitude ratio than phase imbalance. Comparing to the measured value of $H_2/H_{10}$ in experiment, we can notice that 0.5 dB amplitude mismatch and 5° phase mismatch will cause the ratio to deviate from the ideal value and result in the ±10% error of the calculated amplitude compared to the ideal values. The detection accuracy can be further improved by either introducing phase shifter and attenuator/gain-control to pre-compensate the I/Q imbalance or by carrying out detection at the optimal detection distance to alleviate the effect of I/Q mismatch (Y. Yan, C. Li, J. Lin, "Effects of I/Q mismatch on measurement of periodic movement using a doppler radar sensor," IEEE Radio and Wireless Symp, pp. 196-199, 2010.).

IB. Modeling of Harmonic Vibrations

A harmonic vibration of a dynamic system can be generated when the external driving force is harmonic. The general expression of a harmonic vibration can be represented as follows:

$$x(t)=m_1 \sin(\omega t+\phi_1)+m_2 \sin(2\omega t+\phi_2)+\ldots m_N \sin(N\omega t+\phi_N) \quad (8)$$

Since the phase angle of each motion $\phi_1$, $\phi_2$ ... $\phi_N$ are determined by the initial displacement and velocity of the vibration system, there can be different values for every independent test and, thus, the phase of each motion are usually randomly distributed, unless the initial conditions of the system are fixed all the time. As the amplitude, $m_1$, $m_2$, ..., $m_N$, and frequency, $\omega$, information of each harmonic motion are determined by the characteristics of the system itself and the external driving force, the amplitude and frequency can be fixed values that can be accurately determined. Embodiments of the invention relate to a method and system utilizing a wavelength division sensing technique. An embodiment of a wavelength division sensing RF vibrometer can be designed to measure the amplitude and frequency of each motion of the vibration in order to obtain the information of the dynamic system and the driving force. A specific embodiment of a wavelength division sensing RF vibrometer can be used where the phase angles were not considered at that time and assumed to be zero. The following case shows that the assumption of zero phase angles also possesses physical significance.

Using a simple spring-mass dynamic system as an example, when the external driving force has the form of $F(t)=F_0 \sin(\omega t + \phi)$, $\phi$ depends on the value of $F(t)$ at $t=0$ and is usually taken to be zero. For a simple spring-mass system, if we assume the initial displacement $x_0$ at $t=0$ is zero, the total response the harmonically excited vibration can be represented as:

$$x(t) = A\sin\omega_n t + \frac{\delta_{st}}{1 - \left(\frac{\omega}{\omega_n}\right)^2} \sin\omega t \quad \text{for } \frac{\omega}{\omega_n} < 1 \quad (9A)$$

Figure 6:
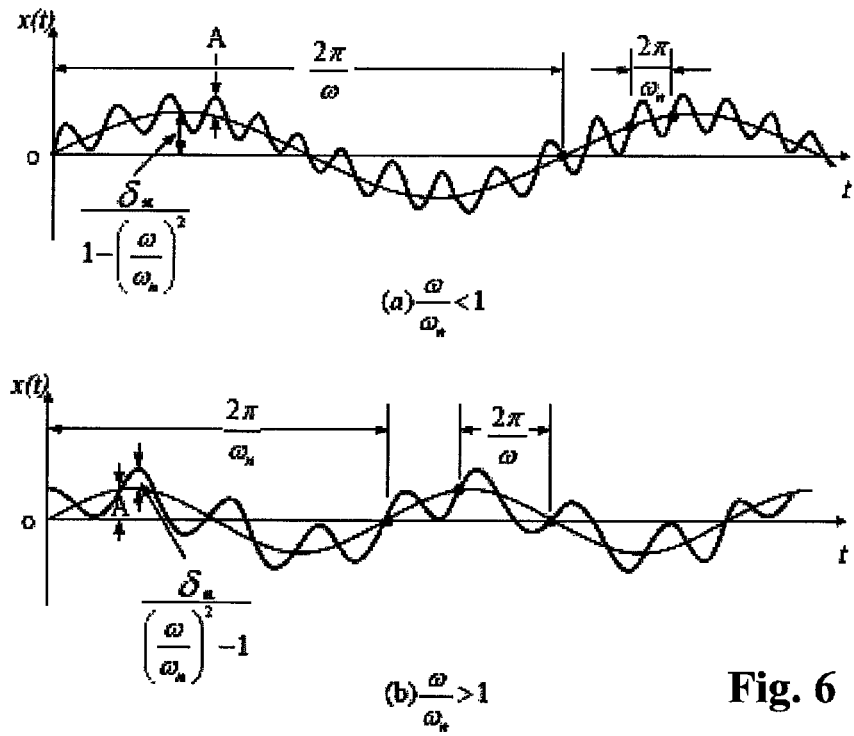
FIG. 6 shows the response of a harmonically excited vibration of a simple spring-mass system with a) $\omega<\omega_n$ and b) $\omega>\omega_n$.

Or $$x(t) = A\sin\omega_n t - \frac{\delta_{st}}{\left(\frac{\omega}{\omega_n}\right)^2 - 1} \sin\omega t \quad \text{for } \frac{\omega}{\omega_n} > 1 \quad (9B)$$

where A represents the amplitude of the natural response, $\delta_{st}$ denotes the static deflection of the mass under of a force $F_0$, $\omega_n$ is the natural frequency of the system, and $\omega$ indicates the frequency of the driving force. The waveforms of the response of the two cases are shown in FIG. 6, respectively. As can be seen, the movement pattern of both equation (9A) and equation (9B) can be fit into the model assumed in equation (1) as:

$$x(t) = m_1 \sin(2\pi f_1 t) + m_2 \sin(2\pi f_2 t) \quad (10)$$

In equation (10), $m_1$ and $m_2$ represent the amplitude of the natural response and particular response to the external force, respectively, and they can be positive or negative numbers. Frequencies $f_1$ and $f_2$ represent $\omega_n$ and $\omega$, and, accordingly, can be arbitrary positive values. The conventional way to obtain the amplitude of each harmonic motion of the vibration in practical application is through numerical procedure, such as Simpson's rule given below. (C. F. Gerald and P. O. Wheatley, Applied Numerical Analysis, 3rd Ed., Addison-Wesley, Reading, Mass., 1984.)

$$a_n = \frac{2}{N} \sum_{i=1}^{N} x_i \cos\frac{2n\pi t_i}{\tau} \quad (11A)$$

$$b_n = \frac{2}{N} \sum_{i=1}^{N} x_i \sin\frac{2n\pi t_i}{\tau}$$

with $$m_n = \sqrt{a_n^2 + b_n^2} \quad (11B)$$

and $$\phi_n = \tan^{-1}\left(\frac{b_n}{a_n}\right) \quad (11C)$$

where $\tau$ is the vibration period, $t_1, t_2, \ldots, t_N$ are the equidistant sampling points with $\Delta t$ $\tau/N$, and $x_1$ is the corresponding value of the movement at $t_i$. In an embodiment, instead of using the time-domain data, an embodiment of the subject wavelength division sensing RF vibrometer can utilize the frequency domain information.

V. Harmonic Analysis of Wavelength Division Sensing Technique and Alternative Detection Method Embodiments of the subject wavelength division sensing RF vibrometer can feature a quadrature direct-conversion architecture, as depicted in FIG. 2. The same transmitting signal is also sent to the down-conversion mixer as the local oscillator (LO) signal in order to take advantage of range correlation effect. (A. D. Droitcour, O. Boric-Lubecke, V. M. Lubecke, J. Lin, and G. T. A. Kovac, "Range correlation and I/Q performance benefits in single-chip silicon Doppler radars for noncontact cardiopulmonary monitoring," IEEE Trans. Microwave Theory and Techniques, vol. 52, pp. 838-848, March 2004.) A software-controlled phase locked loop (PLL) is used to generate different carrier frequencies. It is built by a PLL frequency synthesizer ADF4108 and an external VCO. The vibration is generated by a shaker that is controlled by a processor, such as a laptop. For the movement pattern shown in Equation (10), using complex signal demodulation technique (C. Li and J. Lin. "Random body movement cancellation in doppler radar vital sign detection," IEEE Trans. Microwave Theory and Techniques, vol. 56, pp. 3143-3152, December 2008.), the combined complex baseband signal of I/Q channels can be written as:

$$\begin{aligned} S(t) &= I(t) + jQ(t) \\ &= \exp\left(j\left[\frac{4\pi x(t)}{\lambda} + \phi\right]\right) \\ &= \sum_{k=-\infty}^{\infty} \sum_{l=-\infty}^{\infty} J_k\left(\frac{4\pi m_1}{\lambda}\right) J_l\left(\frac{4\pi m_2}{\lambda}\right) e^{j[2\pi(f_1 k + f_2 l)t]} \cdot e^{j\phi} \end{aligned} \quad (12)$$

where $\phi$ is the total residual phase and $\lambda$ is carrier wavelength, and $J_n(x)$ represents the first kind Bessel function of the nth order. Since $e^{j\phi}$ has a constant-envelope of unity, the effect of $\phi$ on signal amplitude is eliminated, leaving the amplitude of harmonic determined only by the Bessel function coefficient. When the term $f_1 k + f_2 l = x$, it denotes the harmonic frequency equaling to x Hz, and its strength will be:

$$H_x = \left|\sum_{k=-\infty}^{\infty} \sum_{l=(x-f_1 k)/f_2}^{\infty} J_k\left(\frac{4\pi m_1}{\lambda}\right) J_l\left(\frac{4\pi m_2}{\lambda}\right)\right| \quad (13)$$

It can be seen that the amplitude ratio of two harmonics is a function of $\lambda$, which can be represented as $H_x/H_y = f(\lambda)$. Therefore, in order to obtain $m_1$ and $m_2$, an embodiment of the wavelength division sensing technique can implement the following steps:

1) Choosing two harmonics $H_x$ and $H_y$.
2) Measuring $H_x/H_y$ at carrier frequency $f_{c1}$ to provide $H_x/H_y = f_1(\lambda_1)$
3) Measuring $H_x/H_y$ at carrier frequency $f_{c2}$ to provide $H_x/H_y = f_2(\lambda_2)$
4) solving two equations to obtain $m_1$ and $m_2$.

Harmonic pairs can be selected to render more accurate measurement results.

A. Harmonic Amplitude Approximation

Figure 7:
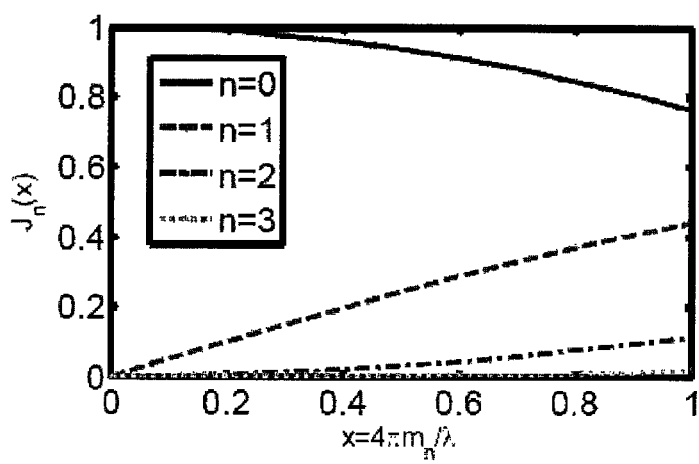
FIG. 7 shows Bessel function $J_n(x)$ of n=0, 1, 2, 3 with 0<x<1.

The strength of harmonics other than the frequency components of the vibration itself increase if a higher carrier frequency is used. In order to distinguish the frequency components belonging to the vibration from the harmonics that are inter-modulation products caused by nonlinear Doppler phase modulation effect, the carrier wavelength is usually at least about 10 times the amplitude of each harmonic motion of the vibration ($\lambda > 10\, m_n$). As represented in equation (13), the strength of each harmonic is determined by the summation of infinite numbers of $J_k(4\pi m_1/\lambda)\, J_l(4\pi m_2/\lambda)$. Thus, it can be important to know the value of Bessel function of different orders. For the condition $\lambda > 10 m_n$, we have $0 < 4\pi mn/\lambda < 1$. Letting $x = 4\pi m_n/\lambda$, FIG. 7 shows the value of Bessel function $J_n(x)$ for the order $n=0$ to $n=3$. The value of $J_{-n}(x)$ can be obtained based on the symmetric characteristics of Bessel function given in equation (14).

$$J_n(x) = \begin{cases} J_{-n}(x) & \text{for even } n \\ -J_{-n}(x) & \text{for odd } n \end{cases} \quad (14)$$

As can be seen from FIG. 7, for $n \geq 2$, the value of $J_n(x)$ will be negligible. The product of two high order ($n \geq 2$) Bessel functions would be even smaller. Therefore, the originally infinite number of terms addition can be approximated by the summation of products that coming from Bessel functions of the order of $n=0$ or $n=\pm 1$.

B. Harmonic Analysis of Wavelength Division Sensing Technique

In this section, the dependence of harmonic amplitude on the Bessel function coefficients based on the previous approximation method is described.

As described in Section IV above, the model of a harmonically excited vibration can be represented as equation (10). Let's arbitrarily assume a vibration having the following expression (unit: mm):

$$X(t) = 3\sin(2\pi \cdot 3 \cdot t) + 2\sin(2\pi \cdot 5 \cdot t) \quad (15)$$

with $m_1 = 3$ mm, $m_2 = 2$ mm, f1=3 Hz, f2=5 Hz and letting $4\pi m_1 = a1$, $4\pi m_2 = a2$. Thus, the expression of harmonic amplitude will be:

$$H_x = \left| \sum_{k=-\infty}^{\infty} \sum_{l=(x-3k)/5}^{\infty} J_k(a_1) J_l(a_2) \right| \quad (16)$$

Referring to equation (12), the frequency of harmonic in the baseband spectrum is determined by $3k+5l$ for this assumed case.

TABLE II

Combination of Bessel Function Index With $3k + 5l = $
x and Harmonic Amplitude Expression With $4\pi m_1/\lambda = a_1$, $4\pi m_2/\lambda = a_2$

| Harmonic Frequency (x Hz) | K | L | Harmonic Amplitude $H_r$ |
|---|---|---|---|
| 1 | 2 | −1 | $|J_2(a_1)J_{-1}(a_2)|$ |
| 2 | −1 | 1 | $|J_{-1}(a_1)J_1(a_2)|$ |
| 3 | 1 | 0 | $|J_1(a_1)J_0(a_2)|$ |
| 4 | −2 | 2 | $|J_{-2}(a_1)J_2(a_2)|$ |
| 5 | 0 | 1 | $|J_0(a_1)J_1(a_2)|$ |
| 6 | 2 | 0 | $|J_2(a_1)J_0(a_2)|$ |
| 7 | −1 | 2 | $|J_{-1}(a_1)J_2(a_2)|$ |
| 8 | 1 | 1 | $|J_1(a_1)J_1(a_2)|$ |

Table II lists the index of k and l that renders $3k+5l=x$. It should be noted that the indexes of k and l for each frequency listed in Table II is not the only combination, there can be numerous combinations for each frequency. For example, for x=4 Hz, (k=3, l=−1), (k=8, l=−4) can also result in $3k+5l=4$. They are not taken into account because of negligible values of high order Bessel functions. Only the dominant combinations of each frequency are shown in Table II. In this way, each harmonic amplitude can be approximated by the product of two corresponding Bessel functions given in Table II.

Figure 8:
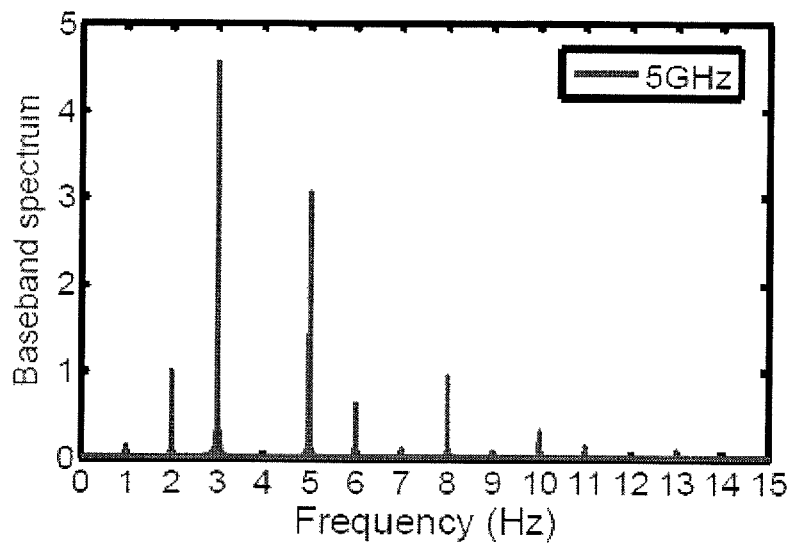
FIG. 8 shows the baseband spectrum of the assumed movement pattern at 5 GHz carrier frequency.

FIG. 8 shows the baseband spectrum of the movement pattern of equation (15) at carrier frequency of 5 GHz. The expressions of harmonic amplitudes shown in Table II explains why some of the harmonics are stronger than the others on the baseband spectrum. A few frequency components from the spectrum are taken as examples.

1) $H_4$: Table II shows its amplitude is mainly determined by $|J_{-2}(a_1)J_2(a_2)|$. As shown in FIG. 7, $J_2(x)$ has much smaller values compared to $J_0(x)$ and $J_1(x)$, which explains its negligible amplitude in the spectrum.

2) $H_2$ and $H_8$: From Table II, it is known that:

$$H_2 = |J_{-1}(a_1)J_1(a_2)| = |J_1(a_1)J_1(a_2)|$$

$$H_8 = |J_1(a_1)J_1(a_2)|$$

$H_2$ and $H_8$ have the same amplitude expressions, explaining why $H_2$ and $H_8$ appear to be equal in the spectrum.

3) $H_3$ and $H_5$:

$$H_3 = |J_0(a_2)J_1(a_1)|$$

and $$H_5 = |J_0(a_1)J_1(a_2)|$$

Since $m_1 > m_2$, $a_1 > a_2$. Based on FIG. 7, we have $J_0(a_2) > J_0(a_1)$, and $J_1(a_1) > J_1(a_2)$. Because both of the two terms of $H_3$ are bigger than those of $H_5$, their product would also be larger. This is why $H_3$ appears to be larger than $H_5$ in the spectrum.

C. Choice of Harmonic Pairs on Detection Accuracy

The detection accuracy of various embodiments utilizing a wavelength division sensing technique can depend on the amplitude ratio of harmonic pairs. The following analysis shows how important the selection of the harmonic pair can be.

1) $H_2$ and $H_8$:
From Section B, it is known that:

$$\frac{H_2}{H_8} = \frac{|J_1(a_1)J_1(a_2)|}{|J_1(a_1)J_1(a_2)|} = 1,$$

which means that $H_2/H_8$ will always equal to 1 regardless of what the carrier frequency is. Therefore, embodiments utilizing the wavelength division technique are not as valuable in this situation.

2) $H_2$ and $H_3$
If we take the ratio between $H_2$ and $H_3$, the result is:

$$\frac{H_2}{H_3} = \frac{|J_{-1}(a_1)J_1(a_2)|}{|J_1(a_1)J_0(a_2)|} = \frac{|J_1(a_1)J_1(a_2)|}{|J_1(a_1)J_0(a_2)|} = \frac{J_1(a_2)}{J_0(a_2)}$$

The Bessel function involving $a_1$, which is actually $m_1$, is canceled out, and the ratio becomes a function determined only by $a_2$ ($m_2$). Even if the ratio is measured twice at two different carrier frequencies, using specific embodiments of the wavelength division sensing technique, an accurate determination of $m_1$ is still not likely to be achieved, as two equations are being used to solve for only one variable, $m_2$. This is also verified through simulation. In simulation, the spectrum of the movement at 5 GHz and 6 GHz are obtained, respectively. The ratio $H_2/H_3$ at 5 GHz is 0.2141 and at 6 GHz is 0.2595. The calculated $m_1$=2.59 mm, $m_2$=2 mm. As expected, an accurate determination of $m_2$ is achieved, but the determination of $m_1$ has 13.7% error, compared to the programmed value 3 mm. Thus, in order to obtain accurate calculation results of both $m_1$ and $m_2$, using harmonic pairs that contain the same order (absolute value) Bessel function that involves the same variable, such as $J_{-1}(a1)$ and $J_1(a1)$ in this case, should be avoided, as the information of interest may be lost by taking the ratio.

3) $H_3$ and $H_5$

Based on the aforementioned analysis, the harmonic pair of $H_3$ and $H_5$ will turn out to be an appropriate pair that can render accurate result of both $m_1$ and $m_2$, as shown in the following analysis.

$$\frac{H_3}{H_5} = \frac{|J_{-1}(a_1)J_0(a_2)|}{|J_0(a_1)J_1(a_2)|} = \frac{J_1(a_1)J_0(a_2)}{J_0(a_1)J_1(a_2)}$$

Since there is no term being canceled, the ratio will be a function involving both variables $a_1$ and $a_2$. Thus, embodiments utilizing a wavelength division sensing technique in this manner can accurately determine both $m_1$ and $m_2$ by solving two equations including both $m_1$ and $m_2$. In simulation, the measured $H_3/H_5$ at 5 GHz is 1.5487 and at 6 GHz is 1.5703. The calculated $m_1$=2.99 mm, $m_2$=1.99 mm. Accordingly, by using the harmonic ratio $H_3/H_5$, an accurate result for both $m_1$ and $m_2$ can be obtained.

Searching from Table II, it is seen that in addition to the pair of $H_3$ and $H_5$, the pairs of $H_2$ and $H_6$, and $H_6$ and $H_8$, would also achieve accurate calculation results. Theoretically, $H_1$ and $H_3$ can also render an accurate result. However, since the level of $H_1$ is relatively low, it could easily be overwhelmed by noise. Accordingly, $H_1$ is thus a less suitable choice for practical measurements.

Accordingly, in order to achieve accurate detection result by using one or more the wavelength division sensing techniques in accordance with embodiments of the invention, one or more of the following principles can be implemented:

1) Avoid using harmonics whose amplitudes are small enough that an accurate determination of the amplitude could be susceptible to noise.

2) Avoid selecting two harmonics that have equal amplitudes, such as $H_2$ and $H_8$.

3) Avoid using two harmonics that include the same order (absolute value) Bessel function of the same variable. For example, $J_n(a_m)$ and $J_n j(a_m)$ or $J_n(a_m)$ and $J_{-n}(a_m)$ are undesirable.

D. Embodiments Employing an Alternative Detection Method Using Multiple Harmonic Pairs at a Fixed Carrier Frequency The prior analysis shows that the detection accuracy of embodiments using a wavelength division sensing technique can depend on the selection of harmonic pairs. Without running any inspection on the amplitude expression of a harmonic on the baseband spectrum, there is likely to be a big deviation of the final calculated amplitude of each harmonic motion of the vibration. Further, since the carrier frequency with respect to certain embodiments is tunable, the complexity of the implementing circuitry, such as a frequency synthesizer or wide tuning range VCO and a broadband antenna, increase the complexity of circuit design and the manufacturing cost for these embodiments. Embodiments of the subject application can utilize a detection technique that is more reliable and features a simpler architecture.

With respect to certain embodiments, instead of measuring the amplitude ratio of a fixed harmonic pair at different carrier frequencies, the ratios of multiple harmonic pairs at a fixed carrier frequency can be measured. A description of a detection methodology that can be incorporated with embodiments of the invention is provided below, assuming the vibration contains N harmonic motions:

1) Choose N different harmonic pairs ($H_x$ and $H_y$), ($H_y$ and $H_z$);

2) Measure the N harmonic amplitude ratios at a fixed carrier frequency $f_c$ $H_x/H_y=f_1(\Delta_1)$ and $H_y/H_z=f_2(\lambda_1)$; and Obtain $m_1, m_2, \ldots m_N$ by solving N equations.

Since this method uses multiple harmonic pairs, the probability is low that all the harmonic pairs are inappropriate is small. Therefore, it is likely that the detection accuracy can be improved, especially when there are more than two harmonic motions in the vibration pattern.

VI. Experimental Verification

In this section, experimental results of an embodiment of a wavelength division sensing RF vibrometer in accordance with the subject invention is provided. The results are first evaluated through harmonic analysis. The improvement of detection accuracy by using embodiments of the subject method that uses multiple harmonic ratios will then be verified.

When measuring a vibration that includes three harmonic motions with $m_1$=2.54, $m_2$=1.896, and $m_3$=0.97, as determined above using the curve fitting toolbox of Matlab™, the reference movement pattern of the vibration is:

$$x(t)=2.54 \sin(2\pi \cdot 4 \cdot t)+1.896 \sin(2\pi \cdot 6 \cdot t)+0.97 \sin(2\pi \cdot 8 \cdot t) \quad (17)$$

FIG. 4B is the measured baseband spectrum at 6 GHz. The harmonic amplitude ratio $H_2/H_{10}$ was chosen with no specific reason. The amplitude of harmonics on the baseband spectrum can be represented as:

$$H_x = \left| \sum_{k=-\infty}^{\infty} \sum_{l=-\infty}^{\infty} \cdots \sum_{p=-\infty}^{\infty} J_k\left(\frac{4\pi m_1}{\lambda}\right) J_l\left(\frac{4\pi m_2}{\lambda}\right) J_p\left(\frac{4\pi m_3}{\lambda}\right) \right| \quad (18)$$

With the constraint condition 4k+6l±8p=x. Since the Bessel function with order higher than 2 has negligible value, in a specific embodiment we consider k, l, p belonging to (0, +1, −1). The list of different combinations of index for each harmonic frequency is shown in Table III.

TABLE III

| x (unit: Hz) | k | l | p |
| --- | --- | --- | --- |
| 2 | 0 | −1 | 1 |
|  | −1 | 1 | 0 |
| 4 | 1 | 0 | 0 |
|  | −1 | 0 | 1 |
| 6 | 0 | 1 | 0 |
| 8 | 0 | 0 | 1 |
| 10 | 1 | 1 | 0 |
| 12 | 1 | 0 | 1 |
| 14 | 0 | 1 | 1 |

Letting $4\pi m_1/\lambda = a_1$, $4\pi m_2/\lambda = a_2$, $4\pi m_3/\lambda = a_3$, we have:

$$H_2 = |J_0(a_1)J_{-1}(a_2)J_1(a_3) + J_{-1}(a_1)J_1(a_2)J_0(a_3)| \quad (19)$$
$$= |J_0(a_1)J_1(a_2)J_1(a_3) + J_1(a_1)J_1(a_2)J_0(a_3)|$$

$$H_{10} = |J_1(a_1)J_1(a_2)J_0(a_3)|$$

$$\therefore \frac{H_2}{H_{10}} = \frac{J_0(a_1)J_1(a_3)}{J_1(a_1)J_0(a_3)} + 1$$

It can be seen that the terms involving $m_2$ are canceled by taking the ratio between $H_2$ and $H_{10}$. Therefore, measuring the ratio three times at three carrier frequencies may not guarantee an accurate calculation result for $m_2$. The pair ($H_6$ and $H_{12}$) or ($H_8$ and $H_{10}$) can be used, as the absolute value of the index of k at $J_k(4\pi m_1/\lambda)$, 1 at $J_1(4\pi m_2/\lambda)$, p at $J_p(4\pi m_3/\lambda)$ are all different from each other, thus ensuring the information involving $m_1$, $m_2$ and $m_3$ are all preserved by taking the ratio. An accurate calculation result can, therefore, be obtained. The calculation results for each movement amplitude, by using the measurement data of the ratio $H_6/H_{12}$ and $H_8/H_{10}$ at the three different carrier frequencies, are ($m_1 = 2.49$, $m_2 = 1.9$, $m_3 = 0.92$), ($m_1 = 2.5$, $m_2 = 1.88$, $m_3 = 0.94$), respectively. Compared to the result ($m_1 = 2.33$, $m_2 = 1.921$, $m_3 = 0.855$) when using the ratio $H_2/H_{10}$, using $H_6/H_{12}$ or $H_8/H_{10}$ can improve the detection accuracy from +10% error to +3% with the reference value given in Equation (17).

On the other hand, because of the reduced probability of having all harmonic pairs be inappropriate, the detection technique using multiple harmonic pairs tends to ensure the accuracy more easily than the wavelength division sensing technique, without the need to carefully inspect the combination of Bessel functions in advance. For instance, regarding the experimental data at 6 GHz, of the three harmonic ratio pairs of $H_2/H_{10}$, $H_6/H_{14}$, and $H_6/H_8$ picked arbitrarily to build equations, we will finally end up with:

$$\frac{H_2}{H_{10}} = \frac{J_0(a_1)J_1(a_3)}{J_1(a_1)J_0(a_3)} + 1 = 2 \quad (20.1)$$

$$\frac{H_6}{H_{14}} = \frac{J_0(a_3)}{J_1(a_3)} = 5.68 \quad (20.2)$$

$$\frac{H_6}{H_8} = \frac{J_1(a_2)J_0(a_3)}{J_0(a_2)J_1(a_3)} = 1.46 \quad (20.3)$$

It can be seen that each pair alone does not include all the information involving $m_1$, $m_2$ and $m_3$, such as $H_2/H_{10}$ loses the information of $m_2$, $H_6/H_{14}$ does not include $m_1$ or $m_2$, $H_6/H_8$ does not include $m_1$. Therefore, none of the three ratios alone would be a good choice for an embodiment using a wavelength division sensing technique. However, by combining the three ratios together an accurate calculation result can be achieved, since the missing information of one pair can be provided by another pair. For example, although $H_2/H_{10}$ does not include $m_2$, $H_6/H_8$ does; the information of $m_1$ contained in $H_2/H_{10}$ and $m_2$ in $H_6/H_8$ can provide the lost information for $H_6/H_{14}$. To achieve the value of $m_1$, $m_2$, and $m_3$, we can first use equation (20.2) to obtain $m_3$, then substitute $m_3$ to equation (20.1) and equation (20.3) to obtain $m_1$ and $m_2$, respectively. The calculation result of the measurement data is $m_1 = 2.5$, $m_2 = 1.9$, $m_3 = 0.94$, all of which has less than 3% error compared to the reference value. Accordingly, implementing a detection technique using multiple harmonic pairs can be a more reliable and suitable detection approach than an embodiment using a wavelength division sensing technique in certain circumstances.

The discussion in sections VII and VII and the corresponding code used in real-time monitoring program are based on an embodiment utilizing a multiple harmonic pairs detection method.

VII. Sensitivity of Harmonic Amplitude Ratio to Additional Phase Angle

It should be noted that although some harmonic vibrations, such as the simple spring-mass vibration with zero initial displacement described in Section IV, can be fit into the model represented in equation (10), the harmonic vibration patterns in real world situations usually include an additional phase angle of each harmonic motion in the vibration as well, as represented in equation (8). The corresponding complex baseband signal can be represented as:

$$B(t) = I(t) + jQ(t) \quad (21)$$
$$= e^{j[\frac{4\pi x(t)}{\lambda} + \phi]}$$
$$= e^{j\phi} \sum_{k=-\infty}^{\infty} J_k\left(\frac{4\pi m_1}{\lambda}\right) e^{jk\omega t} e^{jk\phi_1} \sum_{l=-\infty}^{\infty} J_l\left(\frac{4\pi m_2}{\lambda}\right) e^{j2l\omega t} e^{jl\phi_2} \cdots \sum_{p=-\infty}^{\infty} J_p\left(\frac{4\pi m_N}{\lambda}\right) e^{jN p\omega t} e^{jp\phi_N}$$

When there is no $\phi_1, \phi_2 \ldots \phi_N$, the baseband signal has the following expression:

$$B(t) = I(t) + iQ(t) \quad (22)$$
$$= e^{i[\frac{4\pi x(t)}{\lambda} + \phi]}$$
$$= e^{i\phi} \sum_{k=-\infty}^{\infty} \sum_{l=-\infty}^{\infty} \cdots \sum_{p=-\infty}^{\infty} J_k\left(\frac{4\pi m_1}{\lambda}\right) J_l\left(\frac{4\pi m_2}{\lambda}\right) \cdots J_p\left(\frac{4\pi m_N}{\lambda}\right)$$
$$e^{i[\omega(k+2l+\ldots+Np)t]}$$

As can be seen, when there is no phase angle (22), the amplitude of each harmonic is determined by the summation of real values of Bessel function coefficients. The existence of phase angle makes the harmonic amplitude a summation of complex numbers shown in (21). It can be expected that the absolute value of the harmonic amplitude when there are one or more phase angles will be different from the scenario when there is no phase angles.

The phase angle $\phi_n$ (n=1, 2, ... N) can be random values for each independent measurement case. The useful information, such as the mass of the system (m), the spring coefficient (k), the natural frequency ($\omega_n$) of the system, and the magnitude of the external driving force ($F_0$), can all be determined from the amplitude of each harmonic motion ($m_1$, $m_2$, ... $m_N$) making up the response. The harmonic amplitude ratio can be used to solve for each amplitude, such that it is important to know how sensitive the ratio will be to the phase angle. We will first begin with a single harmonic motion vibration scenario and then provide the detailed analysis and simulation result for a two tone case. A detailed deduction of three tone vibration case can be readily obtained by following the same analysis for a two tone case.

The baseband signal of a single harmonic motion with phase angle can be expressed as:

$$B(t) = e^{i\phi} \cdot \sum_{k=-\infty}^{\infty} J_k\left(\frac{4\pi m_1}{\lambda}\right) e^{ik\omega t} e^{ik\phi_1} \quad (23)$$

Without losing generalization, the amplitude ratio of $H_1/H_2$ can be reviewed.

$$\frac{H_1}{H_2} = \left|\frac{e^{i\phi} J_1\left(\frac{4\pi m}{\lambda}\right) \cdot e^{i\phi_1}}{e^{i\phi} J_2\left(\frac{4\pi m}{\lambda}\right) \cdot e^{i2\phi_1}}\right| = \left|\frac{J_1\left(\frac{4\pi m}{\lambda}\right)}{J_2\left(\frac{4\pi m}{\lambda}\right)}\right| \quad (24)$$

It shows that the phase angle $\phi_1$ has no effect on the harmonic amplitude ratio. It would remain the same as when there is no phase angle $\phi_1$. This makes sense, since for a single tone periodic movement the phase angle indicates the time delay. Accordingly, the phase angle would only shift the whole waveform, without changing the shape. Thus, it can be expected that an accurate determination of the amplitude of a single harmonic motion can be obtained, regardless of its phase angle.

For as two tone case, let us assume a movement as shown in (25):

$$x(t)=2\sin(2\pi\cdot 1\cdot t+\phi_1)+\sin(2\pi\cdot 3\cdot t+\phi_2) \quad (25)$$

And its baseband signal can be written as:

$$B(t) = e^{i\phi} \cdot \sum_{k=-\infty}^{\infty} J_k\left(\frac{4\pi m_1}{\lambda}\right) e^{i2\pi kt} e^{ik\phi_1} \sum_{l=-\infty}^{\infty} J_l\left(\frac{4\pi m_2}{\lambda}\right) e^{i2\pi\cdot 3lt} e^{il\phi_2} \quad (26)$$

Figure 9:
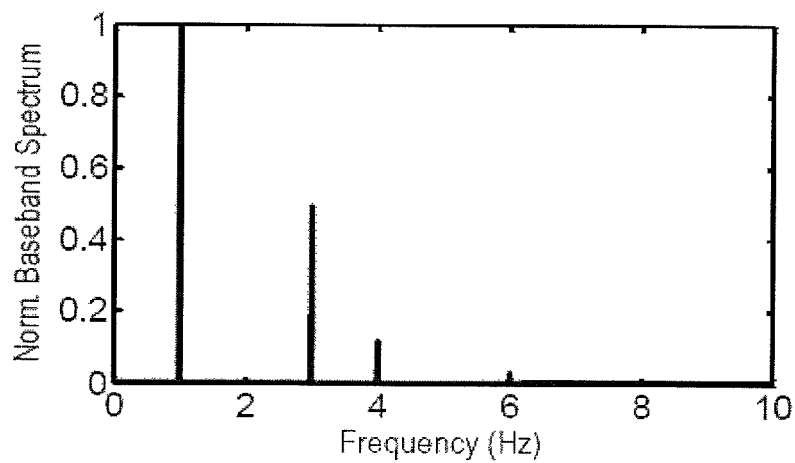
FIG. 9 shows the baseband spectrum of the movement given in equation (26) at 5.8 GHz without phase angle.

Since the Doppler radar sensor used in our experiment works at 5.8 GHz, the simulation is also conducted using this frequency. FIG. 9 shows the baseband spectrum at 5.8 GHz carrier frequency when $\phi_1$ and $\phi_2$ both equal to 0. The frequency of the harmonic in baseband spectrum is determined by k+3l. Ignoring the Bessel function with order higher than 3, the corresponding expressions of each harmonic amplitude can be represented as below:

$$H_1 \approx \left| J_1\left(\frac{4\pi m_1}{\lambda}\right) J_0\left(\frac{4\pi m_2}{\lambda}\right) e^{i\phi_1} - J_2\left(\frac{4\pi m_1}{\lambda}\right) J_1\left(\frac{4\pi m_2}{\lambda}\right) e^{i(\phi_2-2\phi_1)}\right|$$

$$H_2 \approx \left| -J_1\left(\frac{4\pi m_1}{\lambda}\right) J_1\left(\frac{4\pi m_2}{\lambda}\right) e^{i(\phi_2-\phi_1)} + J_2\left(\frac{4\pi m_1}{\lambda}\right) J_0\left(\frac{4\pi m_2}{\lambda}\right) e^{i2\phi_1}\right|$$

$$H_3 \approx \left| J_0\left(\frac{4\pi m_1}{\lambda}\right) J_1\left(\frac{4\pi m_2}{\lambda}\right) e^{i\phi_2} + J_3\left(\frac{4\pi m_1}{\lambda}\right) J_0\left(\frac{4\pi m_2}{\lambda}\right) e^{i3\phi_1}\right|$$

$$H_4 \approx \left| J_1\left(\frac{4\pi m_1}{\lambda}\right) J_1\left(\frac{4\pi m_2}{\lambda}\right) e^{i\phi_1+i\phi_2} - J_2\left(\frac{4\pi m_1}{\lambda}\right) J_2\left(\frac{4\pi m_2}{\lambda}\right) e^{i2\phi_2-i2\phi_1}\right|$$

Figure 10:
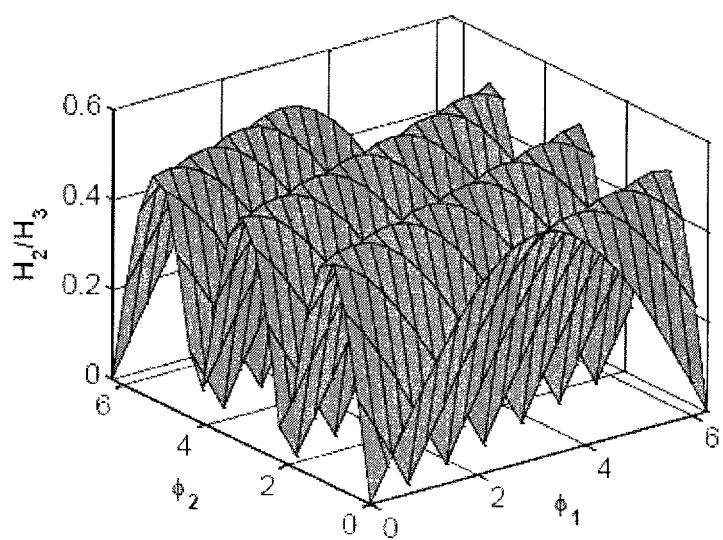
FIG. 10 shows the variation of $H_2/H_3$ vs. ($\phi_1$ and $\phi_2$).
Figure 11:
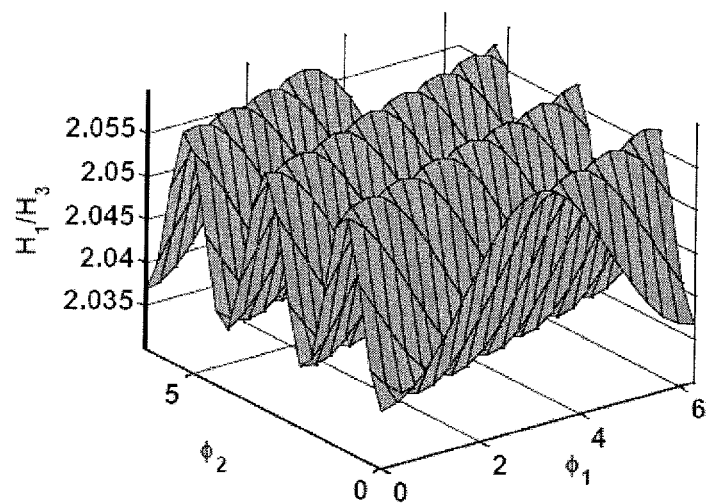
FIG. 11 shows the variation of $H_1/H_3$ vs. ($\phi_1$ and $\phi_2$).
Figure 12:
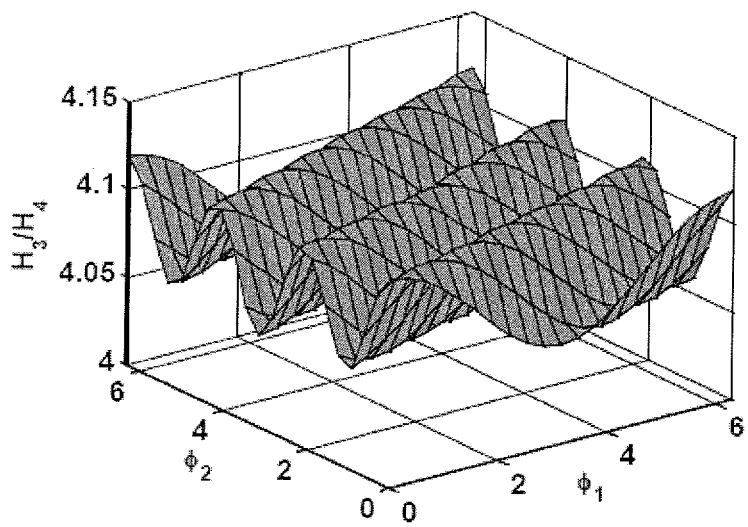
FIG. 12 shows the variation of $H_3/H_4$ vs. ($\phi_1$ and $\phi_2$).

FIGS. 10-12 show the variation of $H_2/H_3$, $H_1/H_3$, and $H_3/H_4$ verses $\phi_1$ and $\phi_2$ from 0 to $2\pi$, respectively. The ideal values of each of the ratios are $H_2/H_3=0$, $H_1/H_3=2.037$, $H_3/H_4=4.12$. It can be seen that the ratio $H_2/H_3$ is much more sensitive to the phase angle compared to the ratio $H_1/H_3$ and the ratio $H_3/H_4$, with maximum deviation of 1% and 1.6%, respectively.

By substituting $m_1=2$ mm, $m_2=1$ mm and $\lambda=51.72$ mm into the Bessel function, the numeric expression of each harmonic can be shown as followed:

$$H_1=|0.2281e^{i\phi_1}-0.0033e^{i(\phi_2-2\phi_1)}|$$

$$H_2=|-0.0273e^{(i\phi_2-i\phi_1)}-0.0274e^{i2\phi_1}|$$

$$H_3=|0.1116e^{i\phi_2}-0.0033e^{i3\phi_1}|$$

$$H_4=|0.0273e^{i\phi_1-i\phi_2}-0.0002e^{i2\phi_2-i2\phi_1}|$$

With respect to $H_1$, $H_3$, and $H_4$, each has a dominate term, which is much bigger than the other, and therefore less susceptible to the phase angle. However, for $H_2$, since the two terms it includes have equal values, it will likely be affected by the phase angle. Any ratios involving $H_2$, therefore, would likely be sensitive to the phase angle. Accordingly, it may be preferable to avoid ratios involving $H_2$, in order to achieve an accurate measurement result for the amplitude of each harmonic motion of the vibration.

Figure 13:
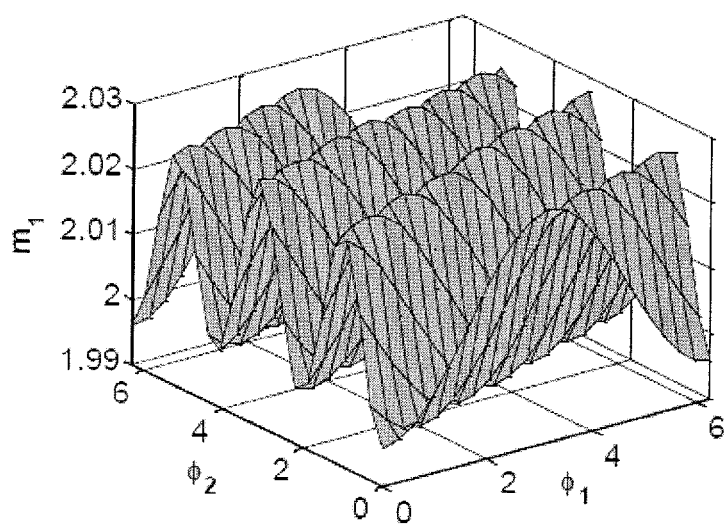
FIG. 13 shows the calculated $m_1$ using $H_1/H_3$ and $H_3/H_4$, reference value $m_1=2$.
Figure 14:
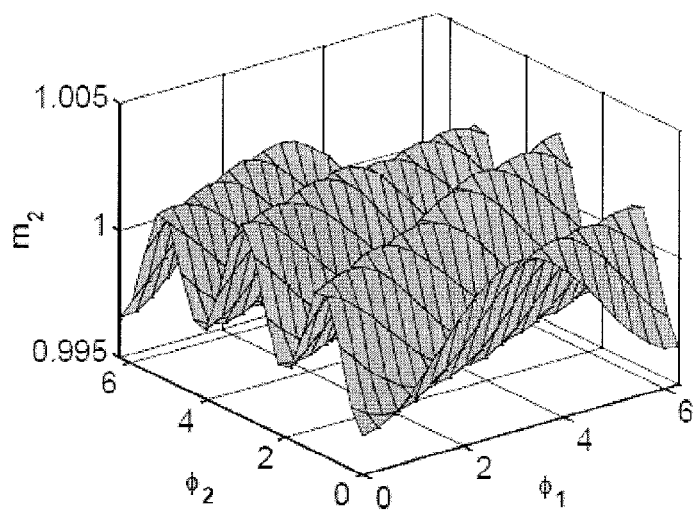
FIG. 14 shows the calculated $m_2$ using $H_1/H_3$ and $H_3/H_4$, reference value $m_2=1$.
Figure 15:
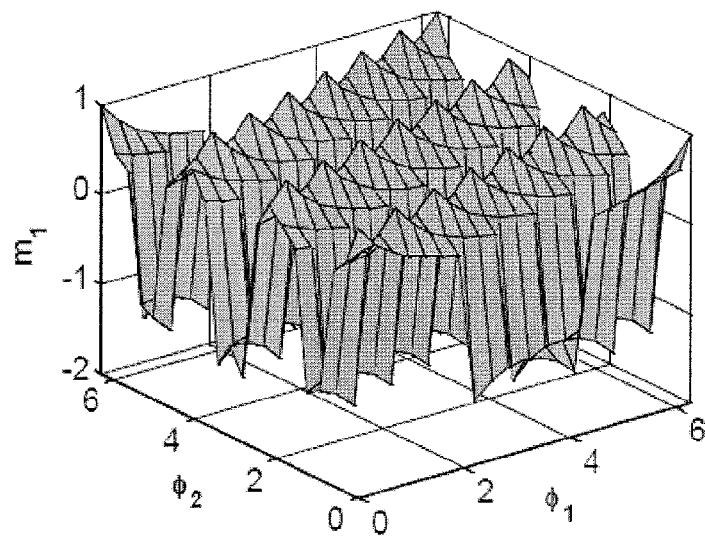
FIG. 15 shows the calculated $m_1$ using $H_2/H_3$ and $H_3/H_4$, reference value $m_1=2$.
Figure 16:
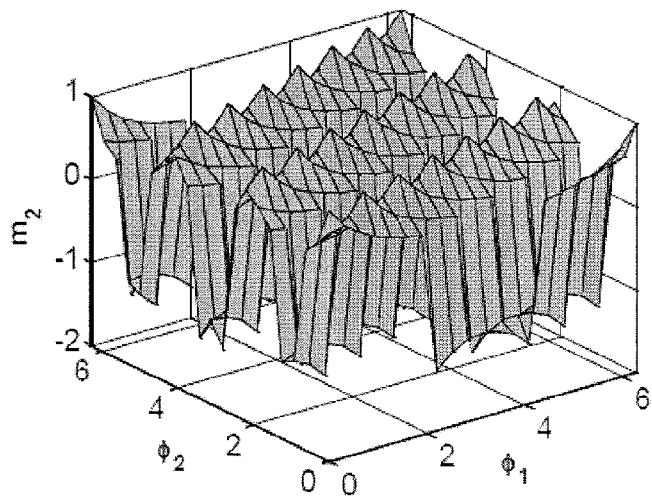
FIG. 16 shows the calculated $m_2$ using $H_2/H_3$ and $H_3/H_4$, reference value $m_2=1$.

FIG. 13 and FIG. 14 show the resulting $m_1$ and $m_2$ by using $H_1/H_3$ and $H_3/H_4$, which are the two insensitive harmonic pairs, as the maximum deviation of both of them are less than 2%; FIG. 15 and FIG. 16 depict the amplitudes calculated from $H_2/H_3$ and $H_3/H_4$. Due to the large variation of $H_2/H_3$, correct values of $m_1$ and $m_2$ are much less likely to be obtained. Meanwhile, the results also show that the use of insensitive harmonic pairs can reduce the deviation of the calculated amplitude caused by phase angle and obtain the accurate information of the dynamic system and external driving force.

VIII. Experimental Implementation of Real-Time RF Vibrometer

Previously reported techniques of using Doppler radar to measure the displacement and velocity (S. Kim, and Cam Nguyen, "On the development of a multifunction millimeter-wave sensor for displacement sensing and low-velocity measurement," IEEE Trans. Microwave Theory and Tech., vol. 52, pp. 2503-2512, November 2004), and the ones that can obtain the pattern of periodic movements (C. Li and J. Lin. "Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007), all require time-consuming post-signal processing in order to acquire the desired information. Embodiments of the invention can allow realization of real-time movement monitoring that can show the pattern of the unknown movement while the detection is going on.

Figure 17:
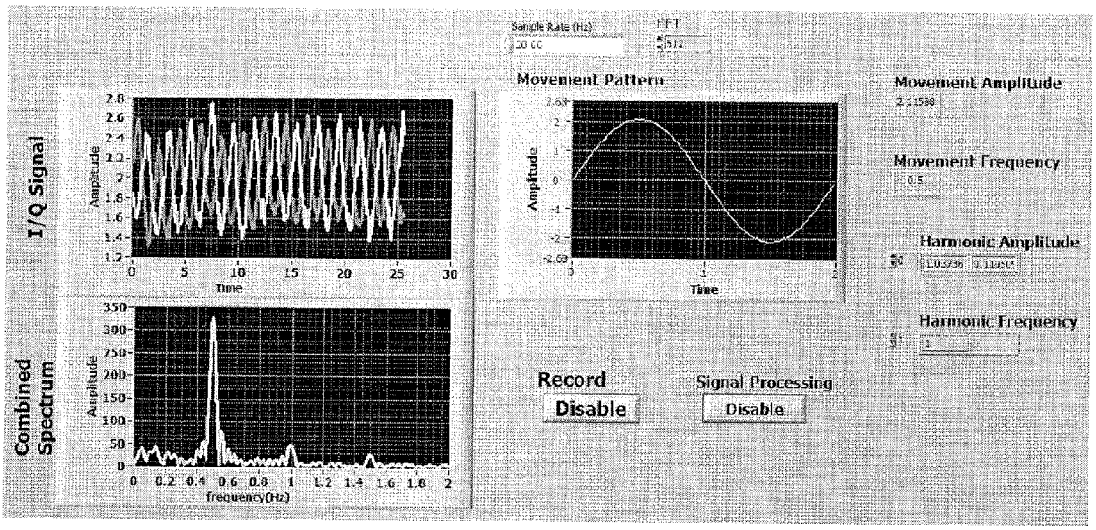
FIG. 17 illustrates the user interface of the real-time monitoring LabView Program.

In this experiment, the carrier frequency of the RF vibrometer is 5.8 GHz. The moving target is driven by a linear actuator that can be program-controlled through a processor, such as a laptop. The parameters of amplitude, frequency, and phase angle of each tone of the vibration can be set in the program. The Matlab codes previously used for the post-signal processing were integrated into a LabView program to realize the real-time movement pattern monitoring. FIG. 17 shows the user interface of the program. The sampling rate is 20 Hz, and the FFT window size is 512. The two left windows are used for the real-time monitoring of the time-domain and frequency-domain of the baseband signal. They are the only signals that can be real-time monitored in previous research (C. Li and J. Lin. "Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007). The right parts on the screen are added afterwards for the movement pattern monitoring. By clicking the "Record" button, the time-domain baseband I/Q signals are being recorded into a file. After collecting the data for 30 s, the recording function is switched off and the "signal processing" button is clicked on. The data file is being read into a Matlab codes integrated in the program to get the accurate baseband spectrum. A peak search block was used in LabView to collect the peaks on the spectrum and their corresponding frequencies. These data are then transferred into another block that runs the detection technique, when the background calculation is finished, the movement pattern of the target will be shown in the right upper window, preferably immediately. The whole background signal processing task can take about 2 seconds to finish after clicking the button. The harmonic frequency and amplitudes that used to do the calculation and the resulted amplitudes and frequencies of all the harmonic motions in the vibration can also be shown on the right hand side of the monitoring screen after the signal processing is finished.

Figure 18:
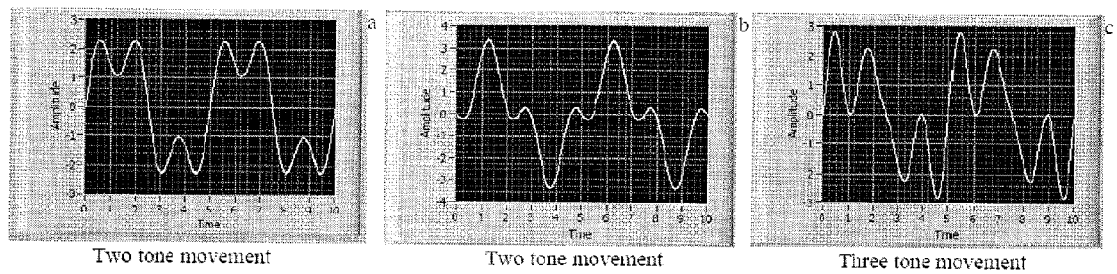
FIGS. 18A-18C show (18A) Program value: $m_1=2$ mm, $m_2=1$ mm, $f_1=0.2$ Hz, $f_2=0.6$ Hz, measurement result: $m_1=2.1$ mm, $m_2=1.05$ mm, $f_1=0.2$ Hz, $f_2=0.6$ Hz, (18B) Program value: $m_1=2$ mm, $m_2=-1$ mm, $f_1=0.2$ Hz, $f_2=0.6$ Hz, measurement result: $m_1=2.15$ mm, $m_2=-1.1$ mm, $f_1=0.2$ Hz, $f_2=0.6$ Hz, and (18C) Program value: $m_1=1.8$ mm, $m_2=1.2$ mm, $m_3=0.8$ mm, $f_1=0.2$ Hz, $f_2=0.6$ Hz, $f_3=0.8$ Hz, measurement result: $m_1=1.77$ mm, $m_2=1.2$ mm, $m_3=0.84$ mm, $f_1=0.2$ Hz, $f_2=0.6$ Hz, $f_3=0.8$ Hz.

One tone movement monitoring has been shown in FIG. 17, with the programmed amplitude of 2 mm and frequency of 0.5 Hz. The measurement result is 2.11 mm and 0.5 Hz. FIGS. 18A-18C show the real-time monitored pattern of two tone and three tone movements. For the two tone movement, two different cases were mimicked. FIG. 18A mimics the scenario when natural frequency of the vibration system is larger than the frequency of the external driving force, which represented by the model in equation (9A). FIG. 18B emulates the opposite situation that the frequency of the excitation force is larger than the natural frequency as indicated in equation (9B). The measurement values and the programmed values of each case are presented in the caption. The deviations are all within 10%. Thus, the improved monitoring program has fulfilled the function of providing the movement pattern of an unknown vibration in real-time. It is also worth mentioning that all the experiments are carried out behind a wall, with the moving target placed at 1.5 m from the antenna. Accordingly, the capability of see-through-wall detection has also been verified.

The sensitivity of the harmonic ratios to the phase angle has also been verified in the experiment.

TABLE IV

Measured $m_1$ and $m_2$ using $H_1/H_3$ and $H_3/H_4$

| | | $\phi_1$ | | | | |
|---|---|---|---|---|---|---|
| | | $\pi/6$ | $\pi/4$ | $\pi/2$ | $5\pi/3$ | $2\pi$ |
| $m_1$ | | | | | | |
| $\phi_2$ | $\pi/6$ | 2.0783 | 2.1752 | 2.171 | 2.2014 | 2.2862 |
| | $\pi/4$ | 2.2911 | 2.2869 | 2.0757 | 2.0033 | 1.8986 |
| | $\pi/2$ | 1.8963 | 2.3001 | 2.3053 | 2.2736 | 2.0876 |
| | $5\pi/3$ | 2.3017 | 1.8988 | 2.087 | 2.1958 | 2.2142 |
| | $2\pi$ | 1.8723 | 2.2749 | 1.9866 | 1.8782 | 1.7701 |
| $m_2$ | | | | | | |
| $\phi_2$ | $\pi/6$ | 1.0548 | 1.1344 | 1.05 | 1.2386 | 1.086 |
| | $\pi/4$ | 0.8369 | 0.9363 | 0.8347 | 0.769 | 1.0381 |
| | $\pi/2$ | 0.7881 | 0.8188 | 1.1396 | 1.0746 | 1.2367 |
| | $5\pi/3$ | 0.8387 | 0.7685 | 1.2366 | 0.8379 | 1.0651 |
| | $2\pi$ | 1.1338 | 1.2443 | 0.8364 | 1.0749 | 0.8334 |

Table IV shows the real-time measured $m_1$ and $m_2$ using $H_1/H_3$ and $H_3/H_4$ at different combination of the additional phase angle $\phi_1$ and $\phi_2$ set in the program.

TABLE V

Measured $m_1$ and $m_2$ using $H_2/H_3$ and $H_3/H_4$

| | | $\phi_1$ | | | | |
|---|---|---|---|---|---|---|
| | | $\pi/6$ | $\pi/4$ | $\pi/2$ | $5\pi/3$ | $2\pi$ |
| $m_1$ | | | | | | |
| $\phi_2$ | $\pi/6$ | 3.6271 | 3.382 | 2.2689 | 4.4606 | 4.0168 |
| | $\pi/4$ | 4.1694 | 4.0179 | 3.3829 | 4.503 | 4.3909 |
| | $\pi/2$ | 4.295 | 4.3926 | 4.5193 | 3.0913 | 4.0181 |
| | $5\pi/3$ | 4.461 | 4.3909 | 4.0172 | 4.2948 | 4.5177 |
| | $2\pi$ | 3.0905 | 3.3806 | 4.0168 | 3.6262 | 2.2671 |
| $m_2$ | | | | | | |
| $\phi_2$ | $\pi/6$ | 0.5811 | 0.6558 | 1.135 | −1.2165 | 0.4843 |
| | $\pi/4$ | 0.4531 | 0.4844 | 0.6559 | −1.151 | −1.3415 |
| | $\pi/2$ | −1.5663 | −1.3441 | −1.1311 | 0.7604 | 0.4848 |
| | $5\pi/3$ | −1.2167 | −1.343 | 0.4847 | −1.5637 | −1.1301 |
| | $2\pi$ | 0.7595 | 0.6561 | 0.4846 | 0.5814 | 1.1349 |

Table V lists the measurement results by using $H_2/H_3$ and $H_3/H_4$. Compared to the programmed value of $m_1$=2 mm and $m_2$=1 mm, it can be seen that by using insensitive harmonic ratio pairs results with much less deviation can be obtained.

In another embodiment, a method of complex signal demodulation technique is used to eliminate the residual effect and realize the capability of using Doppler radar to measure not only sinusoidal, but also non-sinusoidal periodic movements, such as triangular or square-wave movement patterns. The Doppler radar sensor has advantages including a low sampling rate requirement for measuring high-speed vibrations as well as high accuracy.

IX. Detection Theory

Figure 19:
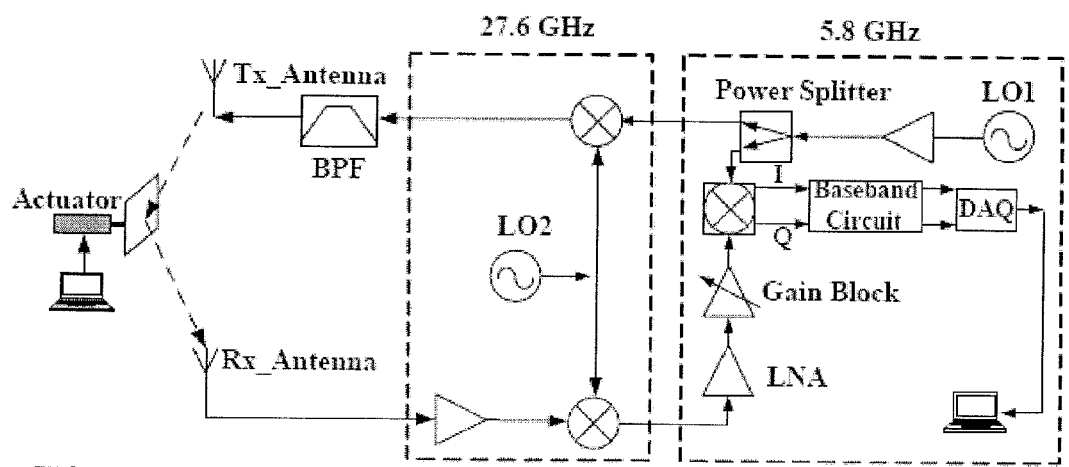
FIG. 19 shows a block diagram of an indirect-conversion 27.6 GHz Doppler radar system in accordance with an embodiment of the subject invention.

The block diagram of a 27.6 GHz Doppler sensor is depicted in FIG. 19. Since a higher carrier frequency will make the nonlinear phase modulation effect more evident and increase the accuracy of measuring small movement amplitudes, a 5.8 GHz carrier is up-converted to 27.6 GHz. In an embodiment, a regular mixer to down-convert the received signal into a single channel can be used. In a more preferred embodiment, a quadrature mixer can be used instead. The following analysis explains why a previously reported system architecture and detection method may not work when measuring non-sinusoidal periodic movement.

In C. Li and J. Lin., ("Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007), the target motion was a single sinusoidal tone x(t)=m sin(ωt), where m and ω represent the movement amplitude and frequency, respectively. The authors in C. Li and J. Lin. ("Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007) used the amplitude ratio between two even-order or two odd-order harmonics in a baseband spectrum to cancel residual phase φ as shown in equation (27), $$H_2 : H_4 = \frac{\left|J_2\left(\frac{4\pi m}{\lambda}\right)\sin\phi\right|}{\left|J_4\left(\frac{4\pi m}{\lambda}\right)\sin\phi\right|} = \frac{\left|J_2\left(\frac{4\pi m}{\lambda}\right)\right|}{\left|J_4\left(\frac{4\pi m}{\lambda}\right)\right|} \qquad (27)$$

where $H_n$ is the amplitude of the nth harmonic. $J_n$ is the Bessel function of the first kind, λ is the carrier wavelength, φ is the total residue phase accumulated in the circuit and along the transmission path. The 2nd-order and 4th-order harmonics are used as an example. It can be inferred from Equation (27) that the movement amplitude m can be extracted from the amplitude ratios between any two even-order harmonics or any two odd-order harmonics. However, if the movement pattern becomes non-sinusoidal that contains not only fundamental tone but also its second harmonic, it is described as $x(t)=m_1 \sin(\omega t)+m_2 \sin(2\omega t)$, where $m_1$ and $m_2$ represent the amplitudes of the fundamental tone and its second harmonic, respectively. Using the similar derivation method presented in C. Li and J. Lin. ("Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007), the following was obtained:

$$H_2 : H_4 = \left| \frac{\sum_{k=-\infty}^{\infty} J_{2-2k}\left(\frac{4\pi m_1}{\lambda}\right) J_k\left(\frac{4\pi m_2}{\lambda}\right)\left[\begin{array}{c}\cos(2\omega t)\cos\phi - \\ \sin(2\omega t)\sin\phi\end{array}\right]}{\sum_{k=-\infty}^{\infty} J_{4-2k}\left(\frac{4\pi m_1}{\lambda}\right) J_k\left(\frac{4\pi m_2}{\lambda}\right)\left[\begin{array}{c}\cos(4\omega t)\cos\phi - \\ \sin(4\omega t)\sin\phi\end{array}\right]} \right| \quad (28)$$

It can be seen from (28) that at each even order harmonic, both $\cos \phi$ and $\sin \phi$ terms exist simultaneously. Therefore, the residual phase $\phi$ cannot be canceled by taking the amplitude ratio among harmonics belong to the same even or odd order group as shown in equation (27). The following analysis shows that by implementing a system architecture supporting complex signal demodulation and a related detection method, non-sinusoidal periodic movements can be measured.

The general expression of a non-sinusoidal periodic movement pattern can be written as: $x(t)=m1 \sin(\omega t)+m2 \sin(2\omega t) \ldots +mN \sin(N\omega t)$. Since in general the strength of harmonics of a periodic signal decreases as the order increases, a finite number of harmonics N is used for analysis and the harmonics with higher order are neglected here.

Using complex signal demodulation, the combined complex baseband signal of the I/Q channels can be written as:

$$S(t) = I(t) + j \cdot Q(t) \quad (29)$$

$$= \exp\left\{ j\left[\frac{4\pi x(t)}{\lambda} + \phi\right]\right\}$$

$$= \sum_{k=-\infty}^{\infty} \sum_{l=-\infty}^{\infty} \ldots \sum_{p=-\infty}^{\infty} J_k\left(\frac{4\pi m_1}{\lambda}\right) J_l\left(\frac{4\pi m_2}{\lambda}\right) \ldots J_p\left(\frac{4\pi m_N}{\lambda}\right) \cdot$$

$$e^{j[(k+2l+\ldots+Np)\omega t]} \cdot e^{j\phi}$$

Since $e^{j\phi}$ has a constant-envelope of unity, the effect of $\phi$ on signal amplitude is thus eliminated. In equation (29), when the term $k+2l+\ldots+N\cdot p$ in the exponent equals to n, it denotes the $n^{th}$ harmonic, and its strength can be represented as:

$$H_n = \left| \sum_{k=-\infty}^{\infty} \sum_{l=-\infty}^{\infty} \ldots \sum_{p=-\infty}^{\infty} J_k\left(\frac{4\pi m_1}{\lambda}\right) J_l\left(\frac{4\pi m_2}{\lambda}\right) \ldots J_p\left(\frac{4\pi m_N}{\lambda}\right) \right| \quad (30)$$

with the constraint of $k+2l+\ldots+N\cdot p=n$. Note that $H_n$ is a function of the amplitudes of N tones composing the movement. Therefore, by finding N pairs of the amplitude ratio among the baseband harmonics, the amplitude of each tone can be obtained by solving N equations involving N variables. Along with the frequency information that can be read from the baseband spectrum directly, the exact non-sinusoidal periodic movement pattern can be reconstructed. Without the constraint which requires using two harmonics from the same even-order or odd-order groups, embodiments of the subject detection technique can potentially improve the detection accuracy, since strongest harmonics can always be chosen for calculation without the need to choose specific harmonics that might be weak and overwhelmed by noise.

X. Experiment

A 27.6 GHz Doppler radar sensor system in accordance with an embodiment of the invention was tested in a lab environment. A horn antenna with 20 dB gain was used to increase the directivity. The power at the antenna input is −20 dBm. With the 3 dB beamwidth of 17.5°, the estimated beam spot size of the antenna at 1 m away is about 0.074 m². The moving target was attached to a precision linear actuator controlled by a computer to produce a desired non-sinusoidal periodic movement. Limited by the maximum velocity and velocity change rate of the actuator, an ideal non-sinusoidal periodic movement with sharp transitions such as triangular-wave or square-wave cannot be generated. Nevertheless, the first three harmonics of a triangular waveform already cover more than 95% of the waveform energy. Thus, in our experiment, a three-tone periodic movement (unit: mm) shown as equation (31) was generated to approximate an ideal triangular-wave movement pattern.

$$x(t)=2.5 \sin(2\pi 0.2 \times t)-0.277 \sin(2\pi \times 0.6 \times t)+0.1 \sin(2\pi \times l \times t) \quad (31)$$

Figure 20A:
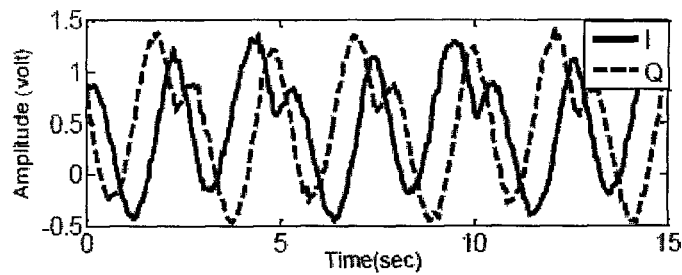
FIGS. 20A-20B show measured time-domain baseband I/Q signals (5A) and a normalized spectrum of combined complex baseband signals (5B) at 1.5 m.
Figure 20B:
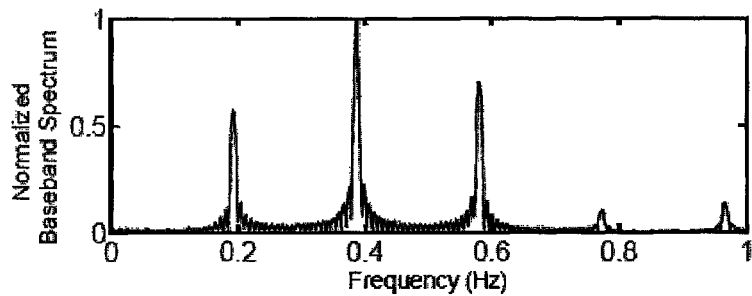

In the experiment, measurements were conducted from the detection distance of 0.5 m to 1.5 m, with an increment of 0.1 m. At each location, the measurement was repeated 10 times. FIGS. 20A and 20B shows the measured baseband time domain and frequency domain signals, respectively. As described in section IX, since the movement consists of three tones, three harmonic amplitude ratios are used to build equations to solve the three unknown amplitudes. In the experiment, $H_1/H_2$, $H_1/H_3$, and $H_1/H_4$ were used. Other harmonic amplitude ratios can also be used as long as the strengths of the chosen harmonics are strong enough to be clearly read from the baseband spectrum.

TABLE VI

Measurement Results (WWC = Waveform Correlation Coefficient)

| Amplitude | $m_1$(mm) | $m_2$(mm) | $m_3$(mm) | WCC |
| --- | --- | --- | --- | --- |
| Worst case | 2.61 | −0.31 | 0.03 | 0.9996 |
| Best case | 2.54 | −0.28 | 0.1 | 1 |
| Average | 2.56 | −0.31 | 0.08 | 0.9999 |
| Reference | 2.5 | −0.277 | 0.1 | 1 |

Figure 21:
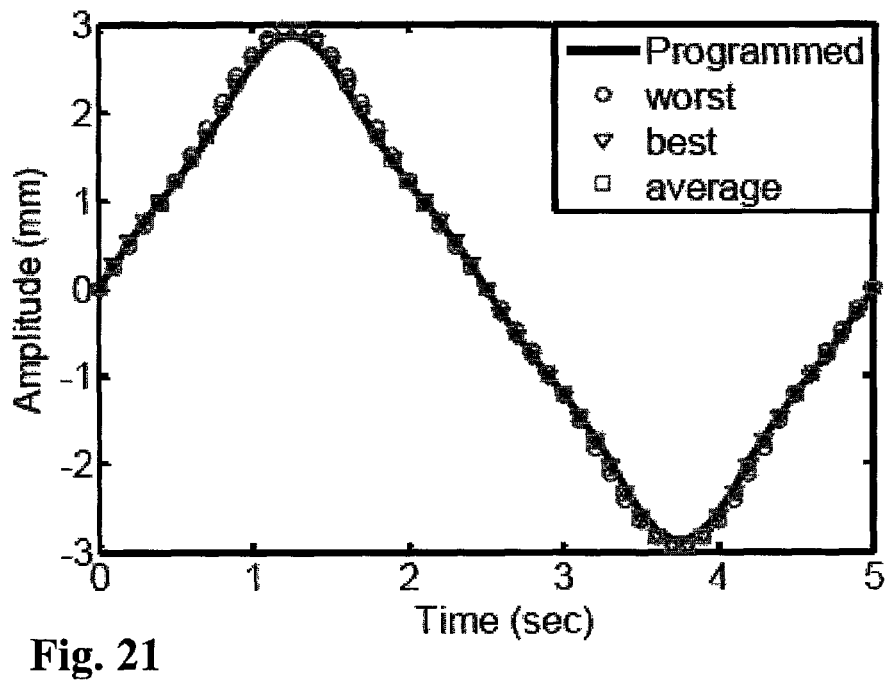
FIG. 21 shows the overlap of reconstructed movement patterns using the worst case, best case, and average measurement results, with the programmed value as reference, produced via an embodiment of the subject invention.

Table VI lists the calculated amplitude value of each tone using the worst case, best case, and average measurement results as compared to the programmed value (reference). The reconstructed movement patterns using the measurement results are depicted in FIG. 21. The correlation coefficient between the recovered waveform and the reference waveform of each case is also listed in Table VI. It is evident that this embodiment of the subject detection technique can recover the movement pattern accurately. Even the worst case result agrees well with the programmed movement pattern. In addition, the 27.6 GHz Doppler radar sensor can also measure movement with much smaller amplitude than the 3 mm shown in FIG. 21. A movement amplitude as small as 0.5 mm was found to be accurately measured. (Y. Yan, C. Li, and J.

Lin, "Ka-band Quadrature Doppler Radar System with Sub-millimeter Resolution and Sensitivity in Measuring Periodic Movement." IEEE Wireless and Microwave Technology Conference, 12-13, April 2010).

XI. Advantages of Doppler Radar Sensor

Figure 22A:
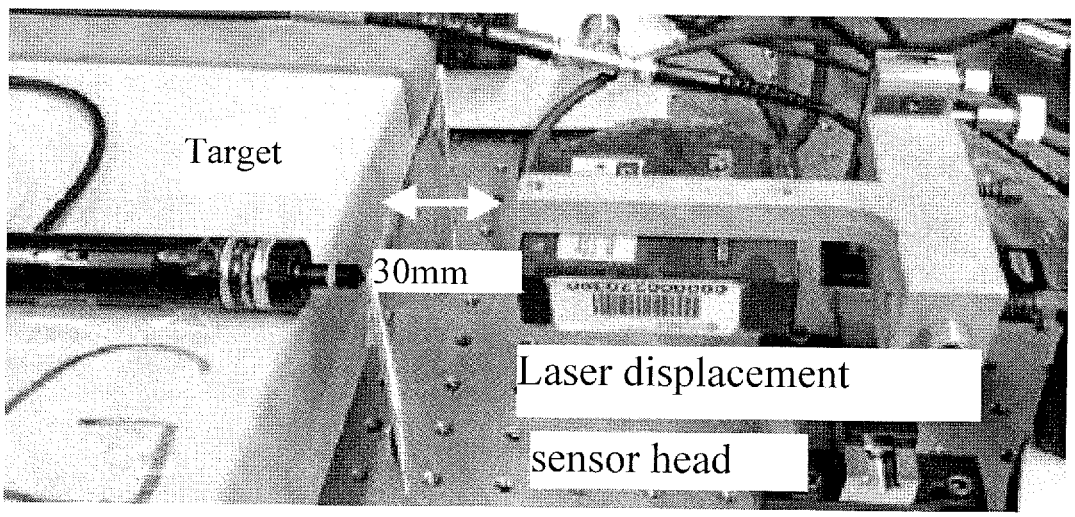
FIG. 22A-22B shows a measurement setup for (22A) a laser displacement sensor LK-G32 and (22B) an RF Doppler radar system in accordance with an embodiment of the invention.
Figure 22B:
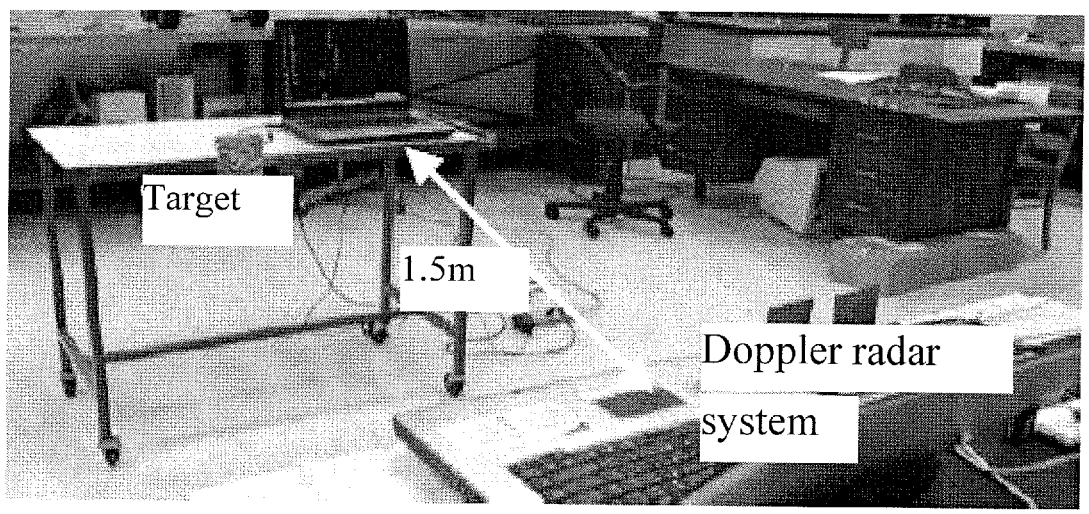

Advantages of embodiments of the subject Doppler radar sensor can be illustrated via comparison with a laser displacement sensor (LDS) LK-G32 manufactured by Keyence Co. The LDS LK-G32 achieves its high accuracy by sacrificing the detection range, which is only 25 mm to 35 mm. Based on triangulation mechanism (Keyence LK-G32 *Laser Displacement Sensor User Manual*, Keyence Corporation, Woodcliff Lake, N.J.), those movements falling out of the detection range cannot generate beam spots small enough for accurate detection. On the other hand, the embodiments of the subject Doppler radar sensor can have a much larger detection range, for example from 0.5 m to 1.5 m. When the moving target is closer than 0.5 m, the baseband signal can become too large and saturate the baseband amplifier. If the target is more than 1.5 m away, the signal-to-noise ratio of the receiving signal can drop below 10 dB, which is required to achieve a reconstructed movement pattern with WCC better than 0.9995. In further embodiments, a larger detection range can be achieved by using a baseband circuit of larger dynamic range and/or higher transmitted power. FIGS. 22A-22B show the measurement setup of the two different sensors. In addition to the advantage of longer range detection, embodiments of the subject Doppler radar sensor can also be easily integrated at relatively low cost, and can remain workable in low-visibility environment, as well as measure movements behind a wall.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCES

[1] S. Kim, and Cam Nguyen, "On the development of a multifunction millimeter-wave sensor for displacement sensing and low-velocity measurement," IEEE Trans. Microwave Theory and Tech., vol. 52, pp. 2503-2512, November 2004.

[2] C. Li and J. Lin. "Non-Contact Measurement of Periodic Movement by a 22-40 GHz Radar Sensor Using Nonlinear Phase Modulation," IEEE MTT-S Int. Microwave Symp. Dig., pp. 579-582, Honolulu, June 2007.

[3] Y. Yan, C. Li, and J. Lin, "Ka-band Quadrature Doppler Radar System with Sub-millimeter Resolution and Sensitivity in Measuring Periodic Movement," IEEE Wireless and Microwave Technology Conference, 12-13, April 2010.

[4] S. H. Y. Lai, "Engine system diagnosis using vibration data," Computers and Industrial Engineering, vol. 25, issue 1-4, pp. 135-138, September 1993.

[5] Y. Yan, C. Li, J. Rice, J. Lin, "Wavelength division sensing RF vibrometer," IEEE MTT-S Int. Microwave Symp. Baltimore, June 2011.
[6] Keyence LK-G32 Laser Displacement Sensor User Manual, Keyence Corporation, Woodcliff Lake, N.J.
[7] P. Castellini, M. Martarelli and E. P. Tomasini, "Laser Doppler Vibrometry: Development of advanced solutions answering to technology's needs," Mechanical Systems and Signal Processing, vol. 20, issue 6, pp. 1265-1285, August 2006.
[8] C. Li and J. Lin. "Random body movement cancellation in doppler radar vital sign detection," IEEE Trans. Microwave Theory and Techniques, vol. 56, pp. 3143-3152, December 2008.
[9] Y. Yan, C. Li, J. Lin, "Effects of I/Q mismatch on measurement of periodic movement using a doppler radar sensor," IEEE Radio and Wireless Symp, pp. 196-199, 2010.
[10] C. F. Gerald and P. O. Wheatley, Applied Numerical Analysis, 3rd Ed., Addison-Wesley, Reading, Mass., 1984.
[11] A. D. Droitcour, O. Boric-Lubecke, V. M. Lubecke, J. Lin, and G. T. A. Kovac, "Range correlation and I/Q performance benefits in single-chip silicon Doppler radars for noncontact cardiopulmonary monitoring," IEEE Trans. Microwave Theory and Techniques, vol. 52, pp. 838-848, March 2004.

The invention claimed is:

1. A method for non-contact measurement of mechanical vibration, comprising:
    transmitting a radio frequency (RF) signal at a first carrier frequency toward a target;
    receiving a reflected RF signal from the target;
    down-converting the reflected RF signal to a baseband signal;
    determining a number N from the baseband signal, wherein N is a number of frequency components of vibration of the target;
    determining N pairs of harmonics;
    determining N amplitude ratios at a second carrier frequency, where each of the N amplitude ratios is an amplitude ratio of a corresponding pair of harmonics of the N pairs of harmonics at the second carrier frequency, the second carrier frequency different than the first carrier frequency; and
    determining information regarding the vibration of the target from the N amplitude ratios.

2. The method according to claim 1, wherein the information regarding the vibration of the target is determined from the N amplitude ratios at the second carrier frequency and N amplitude ratios at equal to the first carrier frequency.

3. The method according to claim 1, wherein N>2.

4. The method according to claim 1, wherein a first carrier wavelength corresponding to the first carrier frequency is greater than 10 times a vibration amplitude of each harmonic of the N harmonic pairs.

5. The method according to claim 1, wherein determining information regarding the vibration of the target from the N amplitude ratios comprises determining a vibration pattern of the target.

6. The method according to claim 1, wherein determining the number N from the baseband signal comprises determining the number N from a baseband spectrum based on the baseband signal.

7. The method according to claim 6, wherein determining the number N from the baseband spectrum based on the baseband signal comprises identifying a number of strongest harmonics in the baseband spectrum, wherein N equals the number of strongest harmonics in the baseband spectrum.

8. The method according to claim 1, wherein the vibration of the target consists of N frequency components.

9. An apparatus for non-contact measurement of mechanical vibration, comprising:
    a transmitter, wherein the transmitter transmits a radio frequency (RF) signal at a first carrier frequency toward a target;
    a receiver, wherein the receiver receives a reflected RF signal from the target;
    a down-converter, wherein the down-converter down-converts the reflected RF signal to a baseband signal; and
    a processor adapted to determine:
        a number N from the baseband signal, wherein N is a number of frequency components of vibration of the target;
        N pairs of harmonics;
        N amplitude ratios at a second carrier frequency, where each of the N amplitude ratios is an amplitude ratio of a corresponding pair of harmonics of the N pairs of harmonics at the second carrier frequency, the second carrier frequency different than the first carrier frequency; and
        information regarding the vibration of the target from the N amplitude ratios.

10. The apparatus according to claim 9, wherein the information regarding the vibration of the target is determined from the N amplitude ratios at the second carrier frequency and N amplitude ratios at the first carrier frequency.

11. The apparatus according to claim 9, wherein N>2.

12. The apparatus according to claim 9, wherein a first carrier wavelength corresponding to the first carrier frequency is greater than 10 times a vibration amplitude of each harmonic of the N harmonic pairs.

13. The apparatus according to claim 9, wherein determining information regarding the vibration of the target from the N amplitude ratios comprises determining a vibration pattern of the target.

14. The apparatus according to claim 9, wherein the processor is adapted to determine the number N from a baseband spectrum based on the baseband signal.

15. The apparatus according to claim 14, wherein the processor is adapted to identify a number of strongest harmonics in the baseband spectrum, wherein N equals the number of strongest harmonics in the baseband spectrum.

16. The apparatus according to claim 9, wherein the vibration of the target consists of N frequency components.

17. A method for non-contact measurement of mechanical vibration, comprising:
    transmitting a radio frequency (RF) signal at a first carrier frequency toward a target;
    receiving a reflected RF signal from the target as a received RF signal;
    down-converting the received RF signal to a baseband signal;
    determining a number N from the baseband signal, wherein N is a number of frequency components of vibration of the target;
    determining N amplitude ratios of a pair of harmonics, wherein each harmonic of the pair of harmonics corresponds to one of the N frequency components, wherein the N amplitude ratios are determined at a corresponding N carrier frequencies; and
    determining information regarding the vibration of the target from the N amplitude ratios of the pair of harmonics.

18. The method according to claim 17, wherein a first carrier wavelength corresponding to the first carrier frequency is greater than 10 times a vibration amplitude of each harmonic of the harmonic pair.

19. The method according to claim 17, wherein determining information regarding the vibration of the target from the N amplitude ratios of the pair of harmonics comprises determining a vibration pattern of the target.

20. The method according to claim 17, wherein determining the number N from the baseband signal comprises determining the number N from a baseband spectrum based on the baseband signal.

21. The method according to claim 20, wherein determining the number N from the baseband spectrum based on the baseband signal comprises identifying a number of strongest harmonics in the baseband spectrum, wherein N equals the number of strongest harmonics in the baseband spectrum.

22. The method according to claim 17, wherein the vibration of the target consists of N frequency components.

23. An apparatus for non-contact measurement of mechanical vibration, comprising:
 a transmitter, wherein the transmitter transmits a radio frequency (RF) signal at a first carrier frequency toward a target;
 a receiver, wherein the receiver receives a reflected RF signal from the target as a received RF signal;
 a down-converter, wherein the down-converter down-converts the received RF signal to a baseband signal;
 a processor adapted to determine the following:
  a number N from the baseband signal, wherein N is a number of frequency components of vibration of the target;
  N amplitude ratios of a pair of harmonics, wherein each harmonic of the pair of harmonics corresponds to one of the N frequency components, wherein the N amplitude ratios are determined at a corresponding N carrier frequencies; and
  information regarding the vibration of the target from the N amplitude ratios of the pair of harmonics.

24. The apparatus according to claim 23, wherein a first carrier wavelength corresponding to the first carrier frequency is greater than 10 times a vibration amplitude of each harmonic of the harmonic pair.

25. The apparatus according to claim 23, wherein the processor is adapted to determine a vibration pattern of the target from the N amplitude ratios of the pair of harmonics.

26. The apparatus according to claim 23, wherein the processor is adapted to determine the number N from a baseband spectrum based on the baseband signal.

27. The apparatus according to claim 26, wherein the processor is adapted to identify a number of strongest harmonics in the baseband spectrum, wherein N equals the number of strongest harmonics in the baseband spectrum.

28. The apparatus according to claim 23, wherein the vibration of the target consists of N frequency components.

* * * * *